US011289907B1

(12) United States Patent
Wells et al.

(10) Patent No.: US 11,289,907 B1
(45) Date of Patent: Mar. 29, 2022

(54) POWER SYSTEM LOAD SCHEDULING

(71) Applicant: PXiSE Energy Solutions, LLC, San Diego, CA (US)

(72) Inventors: Charles H. Wells, San Diego, CA (US); Raymond A. de Callafon, San Diego, CA (US); Sai Akhil Reddy Konakalla, La Jolla, CA (US); Jose Luis Carranza, Chula Vista, CA (US); Patrick T. Lee, San Diego, CA (US)

(73) Assignee: PXISE Energy Solutions, LLC, San Diego, CA (US)

( * ) Notice: Subject to any disclaimer, the term of this patent is extended or adjusted under 35 U.S.C. 154(b) by 0 days.

(21) Appl. No.: 17/467,049

(22) Filed: Sep. 3, 2021

(51) Int. Cl.
| | | |
|---|---|---|
| *H02J 3/00* | (2006.01) | |
| *G05B 13/04* | (2006.01) | |
| *H02J 3/38* | (2006.01) | |
| *H02J 3/46* | (2006.01) | |
| *H02J 3/14* | (2006.01) | |

(52) U.S. Cl.
CPC ............ *H02J 3/003* (2020.01); *G05B 13/042* (2013.01); *H02J 3/001* (2020.01); *H02J 3/004* (2020.01); *H02J 3/0075* (2020.01); *H02J 3/144* (2020.01); *H02J 3/388* (2020.01); *H02J 3/466* (2020.01)

(58) Field of Classification Search
CPC .. H02J 3/003; H02J 3/001; H02J 3/388; H02J 3/466; H02J 3/004; H02J 3/144; H02J 3/0075; G05B 13/042
USPC ......................................................... 700/287
See application file for complete search history.

(56) References Cited

U.S. PATENT DOCUMENTS

| | | |
|---|---|---|
| 8,417,391 B1 | 4/2013 | Rombouts et al. |
| 9,209,625 B2 | 12/2015 | Tyagi et al. |
| 9,606,561 B2 | 3/2017 | Noda et al. |
| 9,847,644 B2 | 12/2017 | Muller et al. |
| 10,158,229 B2 | 12/2018 | Gan et al. |
| 10,210,568 B2 | 2/2019 | Lian et al. |
| 10,396,581 B2 | 8/2019 | Chandan et al. |

(Continued)

OTHER PUBLICATIONS

Ayon et al. "An optimal day-ahead load scheduling approach based on the flexibility of aggregate demands." Applied Energy 198 (2017): 1-11.

(Continued)

*Primary Examiner* — Daniel Cavallari
*Assistant Examiner* — Dru Parries
(74) *Attorney, Agent, or Firm* — Middleton Reutlinger

(57) ABSTRACT

Systems and method are described herein for determining scheduling of electrical power system loads and generation resources. A load scheduling module determines load scheduling characteristics of the electrical power system loads and the generation resources based on power system constraints including power system flow, voltage constraints associated with each electrical system loads or each generation resource, or energy storage capacity of an energy storage device coupled to at least one of the electrical power system loads or the generation resources. The load scheduling module initiates a first signal that curtails power of a subset of the electrical power system loads based on the load scheduling characteristics. The load scheduling module initiates a second signal that adjusts power of at least a portion of remaining loads of the electrical power system loads to accommodate for the subset of the plurality of the electrical power system loads having curtailed power.

25 Claims, 21 Drawing Sheets

(56) References Cited

U.S. PATENT DOCUMENTS 10,545,518 B2  1/2020 Shetty et al.

OTHER PUBLICATIONS

Cui et al., "Industrial power load scheduling considering demand response." Journal of cleaner production 204 (2018): 447-460.
Kang et al., "Optimal load scheduling of plug-in hybrid electric vehicles via weight-aggregation multi-objective evolutionary algorithms." IEEE Transactions on Intelligent Transportation Systems 18.9 (2017): 2557-2568.
Li et al., "Optimal demand response based on utility maximization in power networks." 2011 IEEE power and energy society general meeting, IEEE, 2011.
Lu et al. "A systematic review of supply and demand side optimal load scheduling in a smart grid environment." Journal of cleaner production 203 (2018): 757-768.
Rosehart et al., "Multi-objective optimal power flows to evaluate voltage security costs in power networks." IEEE Transactions on power systems 18.2 (2003): 578-587.
Yorino et al. "Robust power system security assessment under uncertainties using bi-level optimization," IEEE Transactions on Power Systems 33.1 (2018): 352-362.

POWER SYSTEM LOAD SCHEDULING

TECHNICAL FIELD

The current subject matter relates to electrical power grids and, more specifically, to methods and systems for power network load and resource scheduling.

BACKGROUND

Electrical grid systems can experience load curtailments. A load curtailment occurs when electrical loads are removed or reduced for a limited period of time from an electrical grid system. Load curtailments can be either planned or unplanned and occur for a number of reasons. For example, load curtailment can be the result of (i) demand response calls from the utility company, (ii) a resource adequacy agreement between an owner/operator of a subset of the electrical grid and a local load serving entity, (iii) planned replacement, upgrade, and/or service of equipment within the electrical grid, (iv) in climate weather, public safety power shutoff regulations, and the like. In order to ensure the electrical grid system has sufficient power to account for these load curtailments, various load scheduling techniques can be used. As large numbers of renewable energy sources are added to the power system, grid security and reliability concerns (e.g., caused by over voltage or over current) can increase.

SUMMARY

In one aspect, a method of determining scheduling of a plurality of electrical power system loads and generation resources includes receiving, by a load scheduling module, user input initiating load scheduling of the plurality of electrical system loads and the generation resources. The load scheduling module determines load scheduling characteristics of the plurality of electrical power system loads and the generation resources based on power system constraints including at least one of power system flow, voltage constraints associated with each load of the plurality of electrical system loads or each generation resource, or energy storage capacity of an energy storage device coupled to at least one of the plurality of electrical power system loads or the generation resources. The load scheduling module initiates a first signal that curtails power of a subset of the plurality of electrical power system loads based on the load scheduling characteristics. The load scheduling module initiates a second signal that adjusts power of at least a portion of remaining loads of the plurality of electrical power system loads to accommodate for the subset of the plurality of the electrical power system loads having curtailed power.

In some variations, the plurality of electrical power system loads includes one or more clusters coupled to a power grid and a power level of the energy storage device is independent from power curtailment or power adjustment. The load scheduling characteristics are determined by:

$$J = \min_{u_i} \sum_{i=1}^{N} C_{i1}L_{i1}u_{i1} + C_{i2}L_{i2}u_{i2} + \ldots + C_{in}L_{in}u_{in} + P_{bi},$$

where $u_i$ is a decision binary signal if the load is switched on or off, $C_i$ is a cost multiplier, $L_i$ is a load value of a shed load, i and n are each a number of curtailable loads, and $P_{bi}$ is a battery output power.

In other variations, the plurality of electrical power system loads and the plurality of generation resources are islanded and the energy storage resource is subject to power curtailment or power adjustment.

In some variations, the load scheduling characteristics are determined by:

$$J = \min_{u_i, P_{bi}} \sum_{i=1}^{N} G_i + \left( C_{i1}L_{i1}u_{i1} + C_{i2}L_{i2}u_{i2} + \ldots + C_{in}L_{in}u_{in} \right) + P_{bi},$$

where $u_i$ is a decision binary signal if a load is switched on or off, $C_i$ is a cost multiplier, $L_i$ is a load value of a shed load, i and n are each a number of curtailable loads, and $P_{bi}$ is a battery output power.

In other variations, the determining is performed over a moving window with n-intervals.

In some variations, the determining is subject to one or more power system constraints comprising power balancing, voltage bus constraints, branch current limits, shedding capability, priority of load units, or forecasted shedding capability load and generation.

In other variations, the plurality of electrical power system loads and generation resources are prioritized.

In some variations, the determining includes at least one of user constraints including minimum continuous duration of control, maximum duration of control within a defined review period, minimum lockout control period after cessation of control, or maximum continuous duration of control in review period.

In other variations, the determining, the curtailing, and the adjusting occurring during periods of resource constraints to minimize or prevent implementation of rolling blackouts, rotating load curtailments, or automate rolling blackout implementations.

In some variations, the determining includes at least one of dispatch priority conditions including sensitivity of loads on a power system network or fair play dispatch or curtailment schemes.

In other variations, at least one constraint of the optimization includes the minimum on or off time of a load or the number of on/off switching of the load during a 24 hour period.

Systems are also described that include one or more data processors and memory storing instructions which when executed by one or more data processors perform operations described herein. Non-transitory computer program products (i.e., physically embodied computer program products) are also described that store instructions, which when executed by one or more data processors of one or more computing systems, cause at least one data processor to perform operations described herein. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the load scheduling techniques described herein account for the state of charge of batteries within the power system. Additionally, the load scheduling techniques described herein can control power flow within a power system, enabling both retail and wholesale power transactions while keeping within the current and voltage constraints of the power system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Elements of a power system can be disconnected from the power system at any time. Such disconnection can occur on a planned or unplanned basis. For example, on-demand from the utility company, automatically when utility power is lost, or on a timed schedule based on information from the utility or the retail power market. These disconnections are known as a load curtailment. The subject matter described herein addresses load scheduling and power generation of an electrical power system to accommodate for various load curtailment scenarios. The load scheduler can minimize its internal objective function subject to the point of interconnection (POI) flow constraint by specifying the power commands to all internal controllable loads over the planning horizon. The load scheduler can also specify the flow set points of the energy storage devices inside the elements of the power system over the planning horizon. This is done in such a way that the charging and discharging of energy storage units is done within capacity and ramp rates of the energy storage unit.

Figure 1:
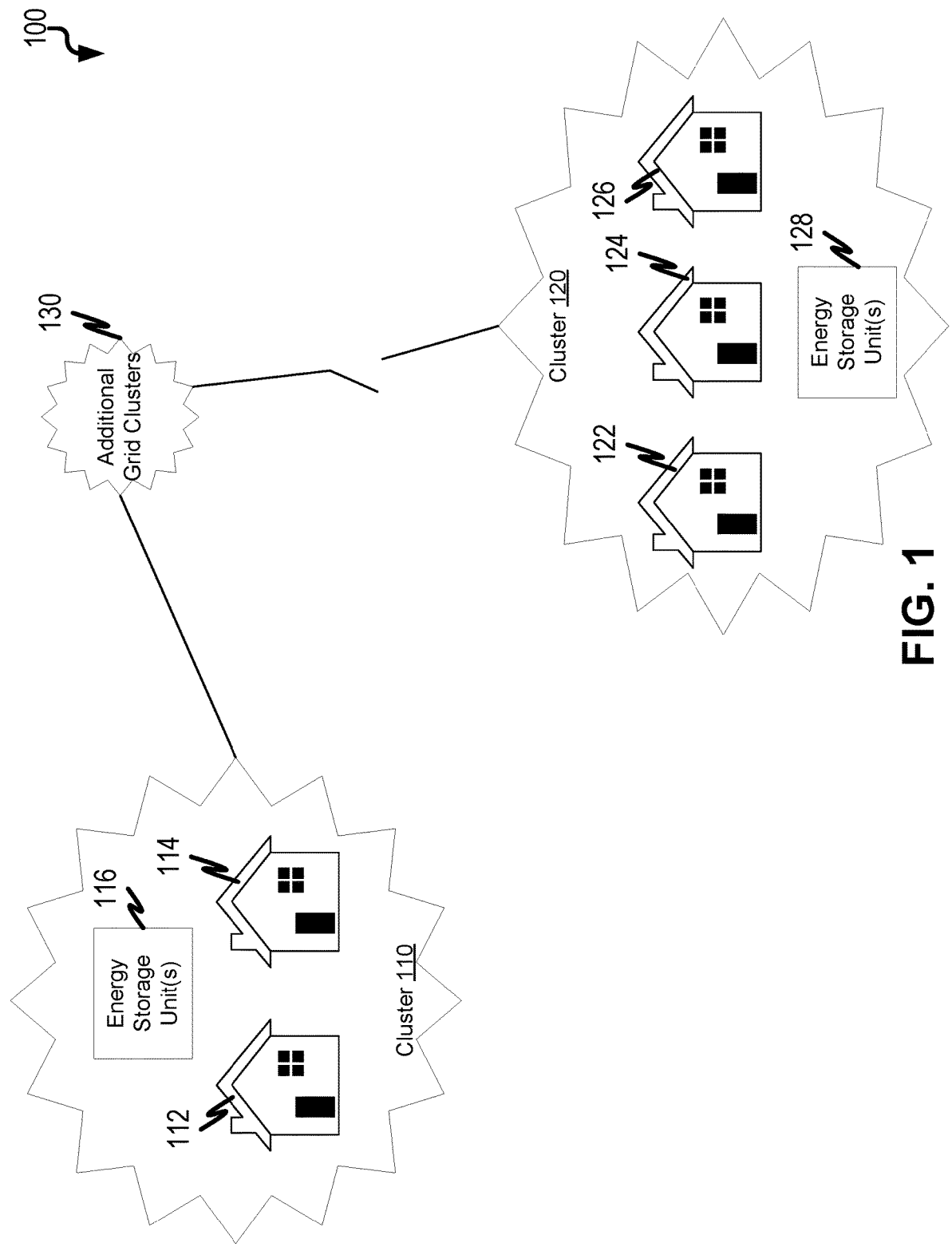
FIG. 1 is a block diagram of a power system decomposed into a number of clusters.

FIG. 1 is a block diagram of a power system 100 decomposed into a number of clusters 110, 120, 130. A cluster can be a distribution substation, a feeder, or a collection of segments within a feeder with substantial controllable distributed energy resource (DER) or a connected microgrid. Organizing clusters 110, 120, 130 or microgrids within the power system 100 allows each cluster 110, 120, 130 to be optimized independently. In these cases, the optimal power flow at the point of interconnection (POI) to the microgrid is determined. Higher level controller can then be used to optimize the entire power system 100. Each cluster has an assigned flow set point. The load scheduler for each cluster manages internal loads of the cluster in a manner that optimizes its own cost function subject to local thermal and voltage constraints, as described in more detail below.

Each cluster can include one or more loads (e.g., one or more DERs, photovoltaic generation components, energy storage, fossil fuel generators, and the like). For example, cluster 110 includes loads 112, 114, and one or more energy storage units 116 (e.g., batteries). Cluster 120 includes loads 122, 124, 126 and one or more energy storage units 128. The clusters form a power system 100. During load curtailment, clusters can operate while (i) connected to the power system 100 or (ii) separated from the power system 100. As illustrated in FIG. 1, cluster 110 is connected to the additional grid clusters 130. This connection is a single point connection known as the POI or Point of Common Coupling (PCC). At the POI, both real and reactive power flow is controlled while the microgrid is connected to the power grid. The flow set point at the POI can be determined based on the current economics of the power market. When determining the load scheduling as described in detail herein as related to cluster 110, the one or more energy storage units 116 are considered not to be controllable. When the cluster 110 is operating in connected mode, the load scheduling techniques described below can be applied. For example, if the cluster 110 is operating under a control command from the utility that requires a constant real power flow at the POI, the load scheduler can be used to internally schedule loads subject to the power constraints that minimize an objective function. In this case, the microgrid controller maintains the flow control, while the load scheduler optimizes the internal load-generation including energy storage profiles subject to voltage and thermal constraints inside the microgrid.

Alternatively, cluster 120 is separated from the additional grid clusters 120 and is operating in island mode. When determining the load scheduling as described in detail as related to cluster 120, the one or more energy storage units 128 is a controllable resource. When the cluster 120 is operating in island mode or at a specified flow set point, it is be operated in a manner that minimizes an objective function (as described in more detail to follow). For example, if the cluster 120 includes critical infrastructure such as hospitals, universities, emergency operating centers, each can have a value associated with continuing to operate while in island mode. That value may also depend on the day of the week and hour of the day. For example, a classroom building may only have class scheduled between 0900 and 1300 hours each week-day. Thus, when the building is unoccupied, its power consumption can be dramatically reduced.

Load curtailments can occur for a number of reasons. For example, a load curtailment can be the result of demand response calls from a utility company. Such a load curtailment causes a constraint on power flow at a POI to be imposed on the cluster and in response the cluster operator may be compensated. In other example, a load curtailment can be as a result of a resource adequacy agreement between the cluster owner/operator and the local load serving entity. The resource adequacy agreement may require a load serving entity to procure capacity commitments of a percentage of their peak loads (e.g., 115%). This requirement can be met by disconnecting participating microgrids. The microgrid operators are compensated for this arrangement generally on a monthly basis. In yet another example, load curtailments can be due to planned replacement, upgrade or service of equipment in the cluster, weather, and/or ordered by the utility under Public Safety Power Shutoff (PSPS) regulations. The PSPS interruptions can generally apply to clusters, thus power is disconnected at the POI for a fixed duration as specified in the PSPS order. Operating microgrids in disconnected mode is one method of meeting PSPS requirements. Another method can include scheduling of rolling blackouts. Other load curtailments include reconnection of a cluster to the power system after natural disasters such as fires, high winds, and/or earthquakes. The load scheduling techniques described herein apply to any of these load curtailment situations. It can be appreciated that although specific load curtailments are mentioned herein by way of example and for ease of understanding. The techniques described herein can be applied to any load curtailment situations.

Figure 2:
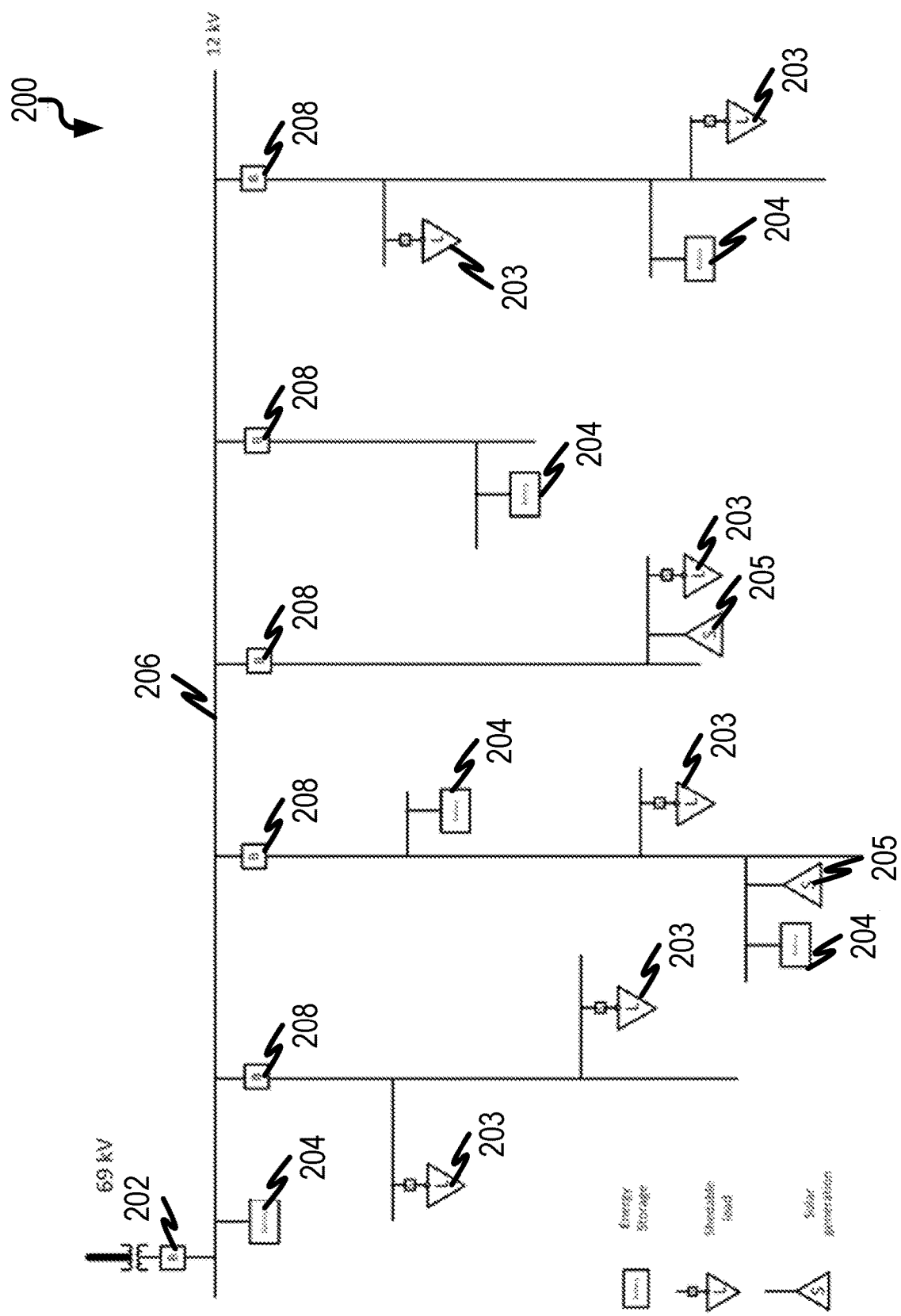
FIG. 2 is a block diagram of an example microgrid in which the load scheduling techniques described herein can be applied.

FIG. 2 is a block diagram of an example microgrid 200 in which the load scheduling techniques described herein can be applied. Microgrid 200 is a collection of loads and generation that can be operated in either grid connected mode or in island mode. Microgrid 200 can be connected to the utility that supplies a portion of the total demand of the microgrid 200. A controllable breaker 202 is used to connect or disconnect from the utility grid. Microgrid 200 includes multiple energy storage devices 204 that provide control of the power flow at the controllable breaker 202, by means of injecting or absorbing power necessary to hold the flow at the POI at its targeted value. Additionally, the microgrid 200 contains multiple sources of renewable power 205 such as wind and solar PV power and controllable non-critical loads 203. In most cases the renewable power can be curtailed if necessary by the controller. The main microgrid bus 206 and the associated breakers 208 can be controlled by the optimizing system. There are conditions where the renewable power will be curtailed by the optimizing system due to system level constraints, such as bus voltage and branch currents.

The microgrid 200 provides services to the utility in the form of demand response, curtailment, fast frequency response, and/or reserve adequacy. The microgrid owner gets paid for these ancillary services. Each of the ancillary service agreements has associated requirements such as speed of response to commands such as ramp rates and error bounds on the real and reactive flow set points the POI. In addition to meeting these requirements, a controller determines the optimal values for flows inside the microgrid 200. The controller determines how to use the energy storage capacity within the microgrid 200 to maximize the benefit to the microgrid owner. This includes the case where the microgrid 200 is ordered by the utility to disconnect from the power grid.

Figure 3:
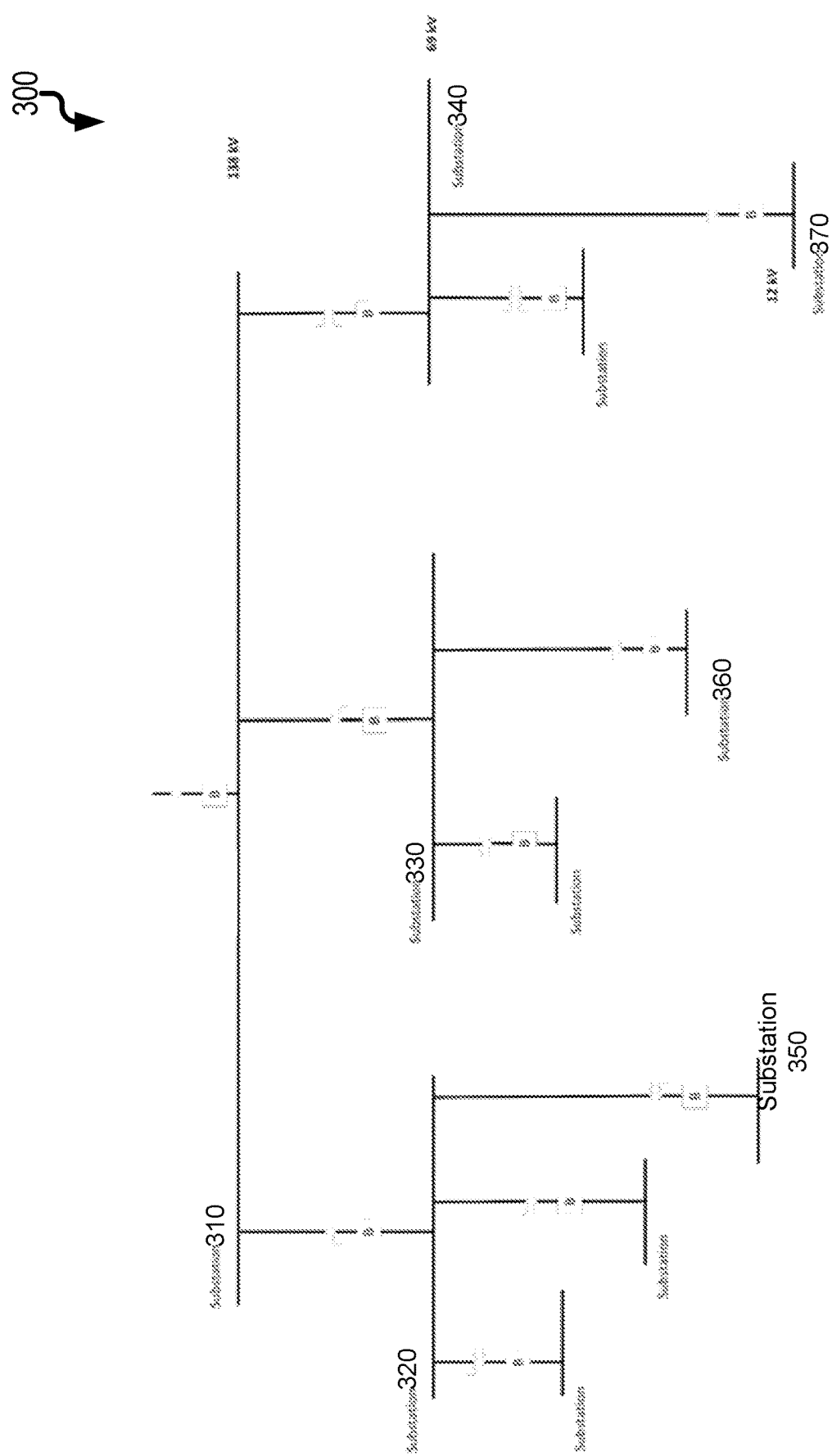
FIG. 3 is a block diagram of an example distribution system in which the load scheduling techniques described herein can be applied.

FIG. 3 is a block diagram of an example distribution system 300 in which the load scheduling techniques described herein can be applied. The distribution system 300 includes a substation 310 (e.g., 138 kV substation) feeding three substations 320, 330, 340 (e.g., 69 kV). Each of these substations feed multiple 12 kV substations 350, 360, 370. The substations 350, 360, 370 feed loads 203 or other microgrids (e.g., microgrid 200) as described in FIG. 2. The feed to each substation is remotely controlled via the breaker feeding that substation.

In some variations, the load scheduling described herein can be used to control substation loads. The substation loads can be curtailed and/or ordered to draw zero power as a result of the load scheduling. Various design constraints relating to controlling substation loads can include branch currents and node voltages in the distribution.

Figure 20:
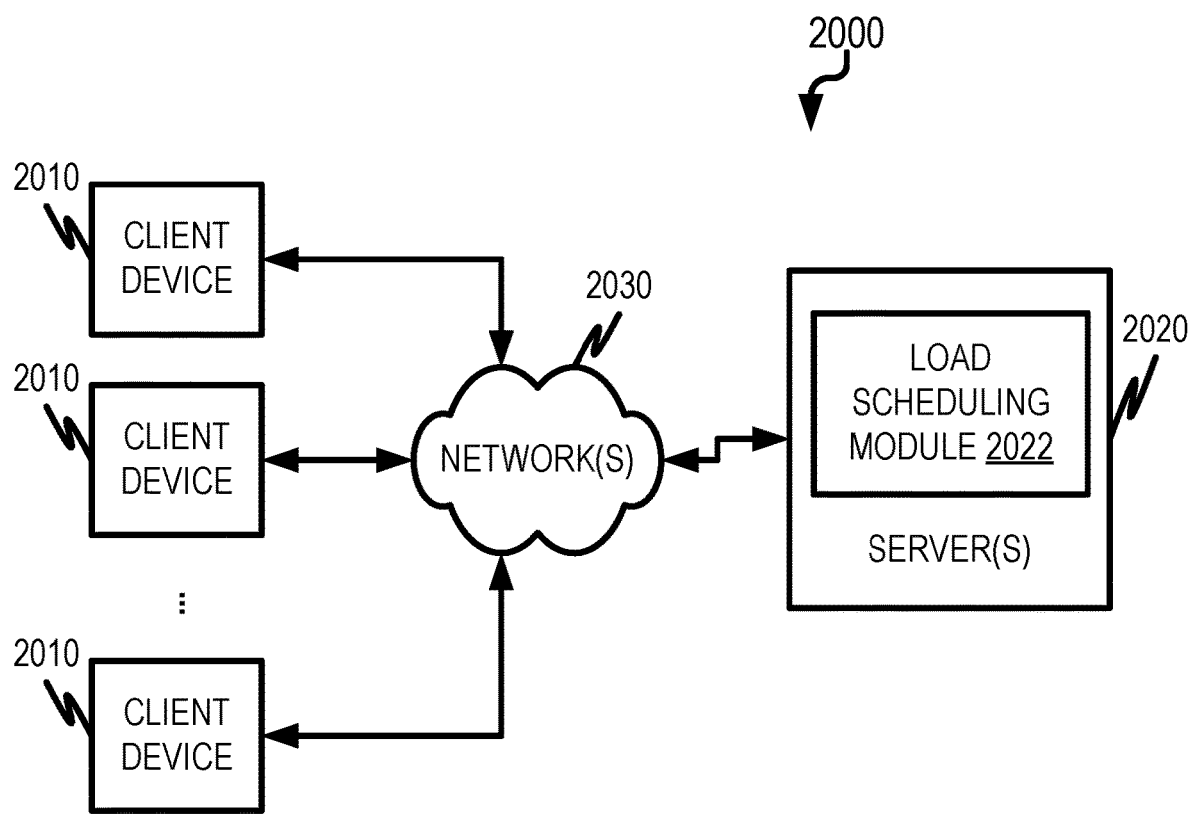
FIG. 20 is a system block diagram illustrating an architecture for use in connection with the current subject matter.

Load scheduling can be performed by a load scheduler module, as described in more detail in FIG. 20. The load scheduler calculates optimal load schedule over the next N-time period (e.g., 24 hours) at m-time period intervals (e.g., 5 minutes) so as to minimize a user configurable set of objective functions such as but not limited to economics, reliability and emissions, subject to specification limits on power system constraints such as voltage on each bus, flow (current) limits on each branch in the network, shedding capability (rating) and priority of load units and forecasted shedding capability (generation) of loads, constraints based on business rules such as minimum continuous duration of control (such as HVAC systems), maximum duration of control within a defined review period, minimum lockout control period after cessation of control, and/or maximum continuous duration of control in planning interval. The load scheduler also considers other operational settings such as but not limited to sensitivity of loads on the network (voltage and thermal constraints), fair play dispatch/curtailment schemes for customers etc.

In one load scheduling scenario, a system of interest (e.g., a cluster or a microgrids) is connected to a power grid without having control of the battery/storage available for load optimization. In another load scheduling scenario, the system of interest is islanded (e.g., grid disconnected) and there is a battery/storage available for load optimization.

The optimal solution of load scheduling includes at least one constraint. This includes any objects being considered such as Virtual Power Plants (VPPs), Generation Facility Energy Management Systems (GFEMS), and/or microgrids.

Load scheduling (e.g., grid connected) may be based on any of the following objectives: economic cost analysis, priority or ranking, and/or a fairness factor, subject to demand and supply limits and/or minimum run-time (on and off) of a load.

An optimal solution for determining load scheduling can be determined using an objective function. In one example, such an objective function that maximizes a cost of operation of loads and the battery at the time of operation can be expressed as follows:

$$J = \min_{u_i} \sum_{i=1}^{N} C_{i1}L_{i1}u_{i1} + C_{i2}L_{i2}u_{i2} + \ldots + C_{in}L_{in}u_{in} + P_{bi} \quad (1)$$

where $u_i$ is the decision binary signal if the load is switched on ($u_i=1$) or off ($u_i=0$), $C_i$ is the cost multiplier that reflects the optimization objectives, $L_i$ is the load value of the shed load, i and n are each the number of curtailable loads, and $P_{bi}$ represents a battery output power.

A power balancing equation can be used to determine a constraint for computing an optimal solution (e.g., expressed in Equation (1)). Such a power balancing equation can be expressed as follows:

$$G_i + (L_{i1}u_{i1} + L_{i2}u_{i2} + \ldots + L_{in}u_{in}) + P_{bi} \geq 0 \quad (2)$$

where $G_i$ is the available generation (discounted with spinning reserve) at any instant, i. Additional inequality constraints may include:

$$|u_{ik} - u_{i+1k}| + |u_{i+1k} - u_{i+2k}| + \ldots + |u_{i+p-1k} - u_{i+pk}| \leq 1, \quad (3)$$

for $k \in (1, 2, \ldots, n)$, where p is the number of time-steps the load shall remain in the ON/OFF state. There are N−p such inequality conditions for i running from 1 to N−p. Equation (2) is also subject to the following battery constraints:

$$Pb_{min} \leq Pb_i \leq Pb_{max} \quad (4)$$

$$SOC_{i+1} = SOC_i + Pb_i \eta i \frac{\Delta T}{CB} \text{ if } Pb_i \geq 0 \quad (5)$$

$$SOC_{i+1} = SOC_i + Pb_i \frac{\Delta T}{\eta i CB} \text{ if } Pb_i < 0 \quad (6)$$

$$SOC_{min} \leq SOC_i \leq SOC_{max} \quad (7)$$

where $P_{bi}$ is the battery power output, $SOC_i$ is the state of charge of the battery at i, $\Delta T$ is the time step of optimization and $\eta_i$ is the battery round-trip efficiency. Since the second constraint is non-convex, a standard transformation technique can be used to make it convex, by introducing a new variable, $v_i$, $$v_{ik} - v_{i+1k} + v_{i+1k} - v_{i+2k} + \ldots + v_{i+p-1k} - v_{i+pk} \leq 1 \quad (8)$$

$$v_{ik} \leq u_{ik} - u_{i+1k} \quad (9)$$

$$v_{ik} \geq -u_{ik} + u_{i+1k} \quad (10)$$

Additional constraints include voltage limits on each bus inside the cluster and current limits across power lines and transformers in power system. Typically, the voltage limits are plus or minus five percent of the nominal system voltage and the current limits are determined by wire conductor size, material construction and manufacturers specifications. A network model is used to determine if a proposed iteration provides a solution that is inside or on one or more constraint. If any variable is outside of the constraints, a next iteration is performed. This is repeated until the proposed solution is within constraints.

In some variations, the load scheduling can be performed for islanding scenario. Under islanding, the load scheduling meets the following objectives: minimizing load curtailment while ensuring maximum up time of the microgrid (battery State of Charge (SOC) included), priority or ranking of loads capable of curtailment, and the fairness factor. The fairness factor is defined as a weighting applied to loads capable of curtailment so that the same set of loads are not curtailed all the time. The scheduling for islanding is also subject to the following constraint: supply and generation match (e.g., at all times when the microgrid is in island mode, the available generation can be equal to or exceed the total demand in order to maintain operation of the microgrid), minimum run-time (on and off) of a load, battery power, and/or energy limits.

The following objective function can be used to determine an optimal load scheduling under islanding conditions:

$$J = \min_{u_i, P_{bi}} \sum_{i=1}^{N} G_i + \left(C_{i1}L_{i1}u_{i1} + C_{i2}L_{i2}u_{i2} + \ldots + C_{in}L_{in}u_{in}\right) + P_{bi}, \quad (11)$$

$$G_i + (L_{i1}u_{i1} + L_{i2}u_{i2} + \ldots + L_{in}u_{in}) + P_{bi} \geq 0 \quad (12)$$

$$|u_{ik} - u_{i+1k}| + |u_{i+1k} - u_{i+2k}| + \ldots + |u_{i+p-1k} - u_{i+pk}| \leq 1 \quad (13)$$

for $k \in (1, 2, \ldots, n)$, where p is the number of time-steps the load shall remain in the ON/OFF state. There are N−p such inequality conditions for i running from 1 to N−p. Equation (11) describes an objective function relating to total generation and loads for minimization. Equation (12) describes a constraint of power availability (i.e., available generation that exceeds total demand). Equation (13) defines a change in state of individual load switching over a period of p time-steps, ensuring that loads do not switch more than once in a period of p time-steps.

The following battery constraints are also considered with Equations (11)-(13) to determine an optimal load scheduling under islanding conditions:

$$Pb_{min} \leq Pb_i \leq Pb_{max} \quad (14)$$

$$SOC_{i+1} = SOC_i + Pb_i \eta i \frac{\Delta T}{CB} \text{ if } Pb_i \geq 0 \quad (15)$$

$$SOC_{i+1} = SOC_i + Pb_i \frac{\Delta T}{\eta i CB} \text{ if } Pb_i < 0 \quad (16)$$

$$SOC_{min} \leq SOC_i \leq SOC_{max} \quad (17)$$

where $G_i$ is the available generation (discounted with spinning reserve) at any instant i, $L_i$ is the load value of the shed load and n is the number of curtailable loads, $P_{bi}$ is the battery power output, $SOC_i$ is the state of charge of the battery at i, $\Delta T$ is the time step of optimization and $\eta_i$ is the battery round-trip efficiency.

The power system operating characteristics are also used as constraints. This typically includes upper limits on current flowing in each branch, high and low limits on voltages at each bus, and power transfers across transformers, switches and other devices in the network. These constraints are checked at each iteration in the optimization process.

Figure 4:
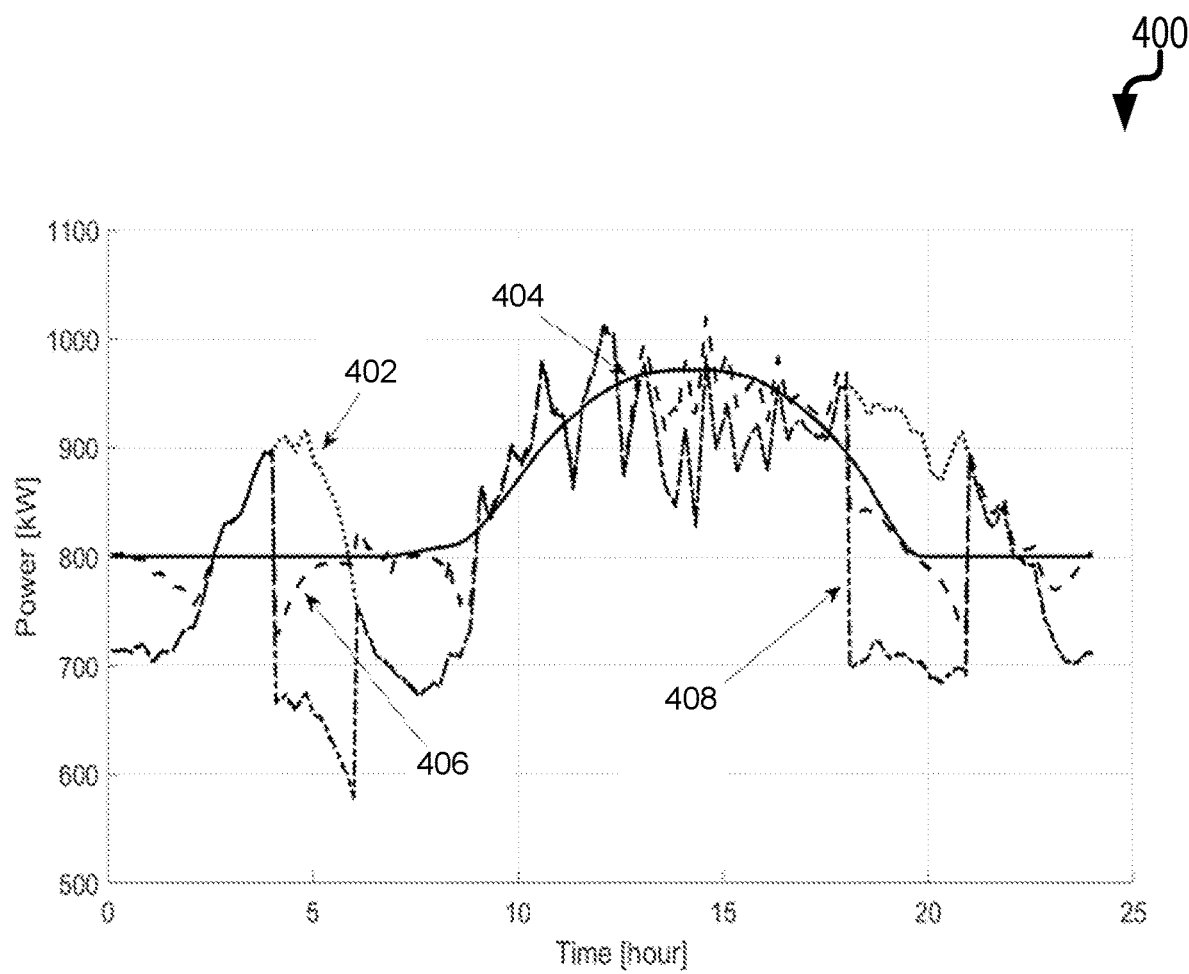
FIG. 4 is a graphical illustration of load scheduling maximizing operational time during islanding.

FIG. 4 is a graphical illustration 400 of load scheduling maximizing operational time during islanding. The x-axis in FIG. 4 denotes time in hours. The y-axis in FIG. 4 denotes the size of the load measured in terms of kilowatts (kW) of power. Islanded microgrid resiliency is relevant during periods of grid loss due to safety or unforeseen events. During periods of grid loss due to safety or unforeseen events, the amount of time microgrids keeps an area energized is a priority. To maximize the life a microgrid, the load is curtailed in the priority order and/or the battery is used to discharge when there is more demand and charge when there is more supply.

In FIG. 4, data line 402 is the actual (uncontrolled) load in the microgrid. Data line 404 depicts the total available generation in the microgrid which can include renewable and/or non-renewable sources of power. Data line 406 is the total generation plus storage (with control). Data line 408 is the controlled or curtailed load in the microgrid in a 24 hour period of the day. As illustrated in FIG. 4, the (total demand) 408 is under (total generation+storage) 406 to keep the microgrid alive. Additionally, the curtailment was needed at 2 hours and 18 hours to keep high cost (e.g., critical) loads contained within the microgrid operational. This is because the optimization hits active constraints where the available generation was less than the total load demand. One solution to keeping the high cost (e.g., critical) loads within the microgrid operational is to curtail the lowest cost loads at 2 hours and 18 hours. In the middle of the day (e.g., around 12:00 hours), the battery discharging helps minimize load curtailment while keeping high cost (e.g., critical) loads operational within the microgrid and keeping the microgrid operational.

Figure 5:
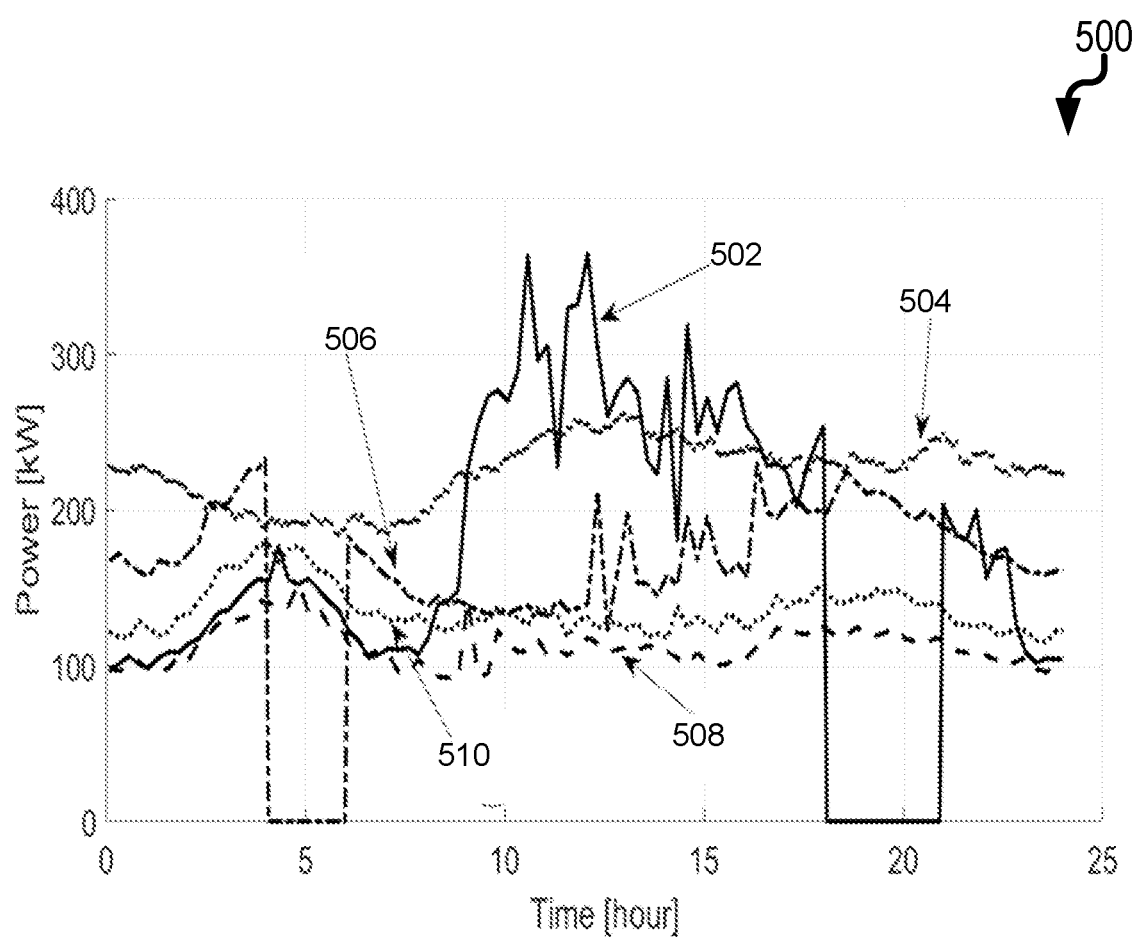
FIG. 5 is another graphical illustration of load scheduling maximizing operational time during islanding.

FIG. 5 is another graphical illustration 500 of load scheduling maximizing operational time during islanding. Data lines 502, 504, 506, 508, and 510 depict the controlled or curtailed loads in the microgrid accounting to the total demand of the microgrid. The x-axis in FIG. 5 denotes time in hours. The y-axis of FIG. 5 denotes the size of the load measured in terms of kW of power. Whenever data lines 502, 504, 506, 508, and 510 go to the value of approximately 0 kW, the corresponding load is curtailed and turned off. As illustrated in FIG. 5, the power of data line 502 is curtailed at about 18 hours (e.g., shown by the 0 power value between about 18 hours and 21 hours in FIG. 5). The power of data line 506 is curtailed at about 4 hours (e.g., as shown by the 0 power value between about 4 hours and 6 hours in FIG. 5). Once a load is curtailed, the load scheduling techniques described herein prioritize the load that was not curtailed during that particular day to ensure fairness of curtailment. The load scheduling also ensures a minimum time off for a particular load that is being curtailed. In the example of FIG. 5, the minimum time off is 2 hours, as illustrated in FIG. 5 by data line 502 and data line 506. The power value of the loads corresponding to data line 502 and data line 506 are at approximately 0 kW (e.g., turned off) for at least 2 hours.

Figure 6:
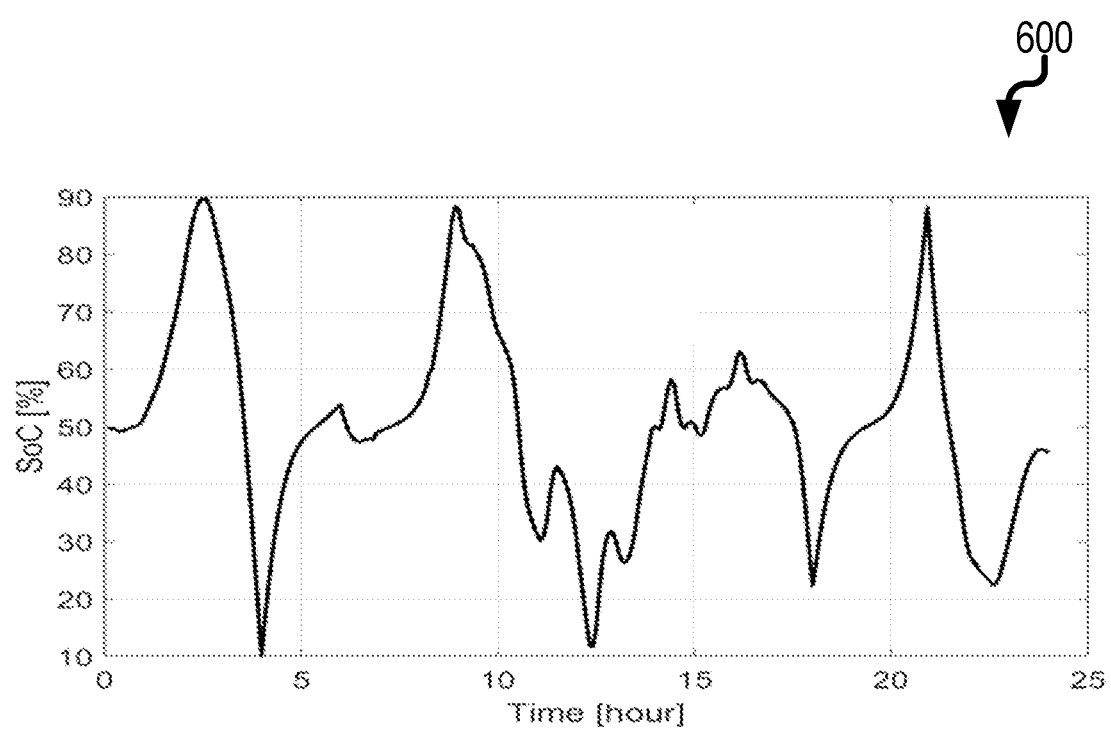
FIG. 6 is a graphical representation of the state of charge of a battery system throughout the 24 hour period during islanding.

FIG. 6 is a graphical representation 600 of the state of charge of a battery system throughout the 24 hour period during islanding. The x-axis in FIG. 6 denotes time in hours. The y-axis of FIG. 6 denotes the SoC representing the relative electric energy stored inside the battery measured in percentage. As illustrated in FIG. 6, the battery charges and discharges to ensure minimization of load curtailment, keeping the demand of the critical loads and the generation within the microgrid balanced, often labeled as while keeping the microgrid operational Since the microgrid is expected to remain in island mode for a known period, beginning and ending state of charge may not be the same because the optimization uses the battery to minimize load curtailment without any end constraints (no need for repeatability). The state of charge bounds is contained between defined minimum and maximum limits of energy storage of the battery to not exceed allowed bounds of operation of the energy storage of the battery. In the example in FIG. 6, those minimum and maximum limits are about 10-90% of energy storage of the battery to not exceed allowed bounds of operation of the energy storage of the battery.

Figure 7:
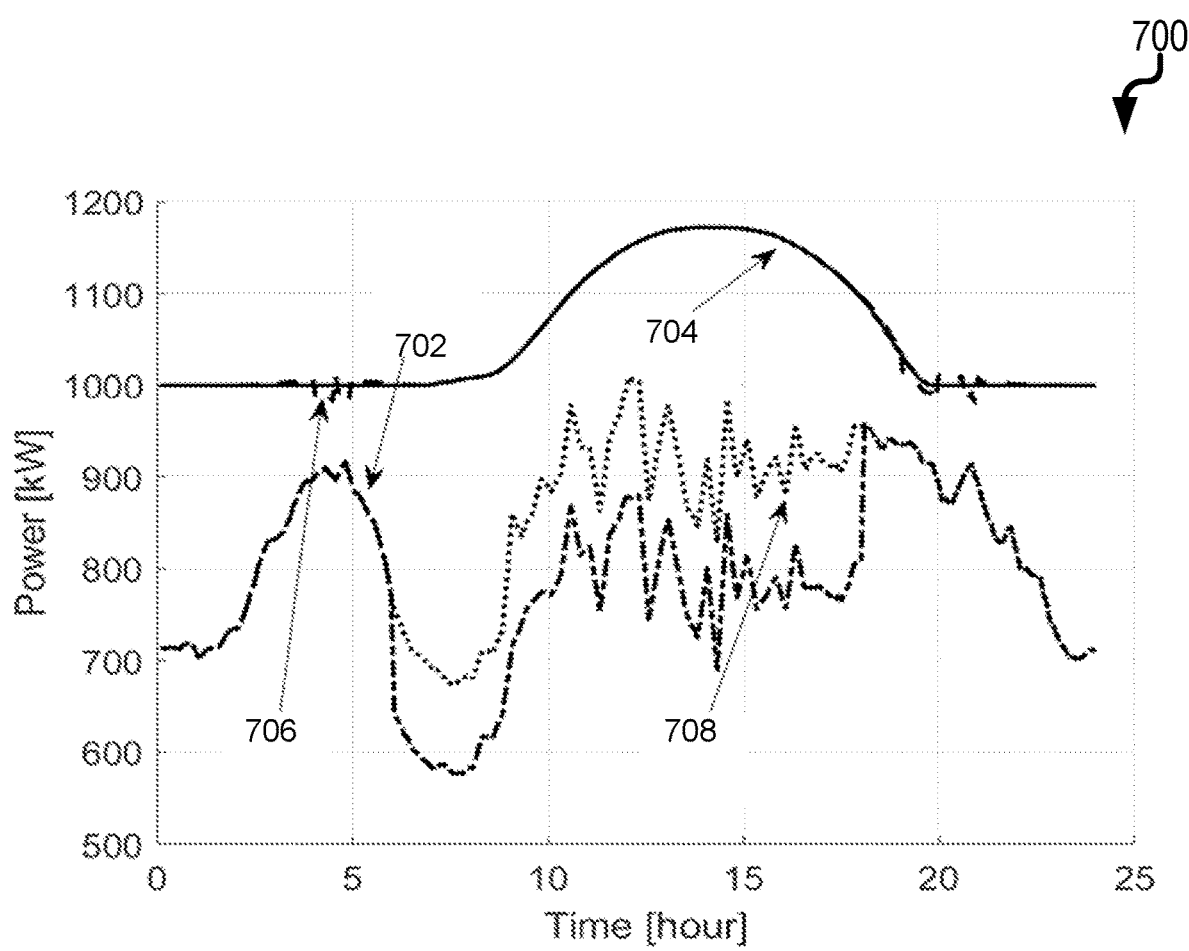
FIG. 7 is a graphical representation of load scheduling that maximizes demand response by internal load management.

FIG. 7 is a graphical representation 700 of load scheduling that maximizes demand response by internal load management. Demand response agreements with customers can provide the means for a utility company to specify the power flow at the customer POI for a specific time. This can be beneficial to the utility as it does not require the utility to install or contract for expensive spinning reserves. This also reduces spinning reserves required since the demand is lowered rather than supply increased.

Data line 702 is the actual (uncontrolled) load in the microgrid. Data line 704 is the total available generation in the microgrid which includes renewable and/or non-renewable sources of power along with the power that can come from the microgrid interconnection. Data line 706 is the total generation plus storage (with control). Data line 708 is the controlled or curtailed load in the microgrid in a 24 hour period of the day. As illustrated in FIG. 7, the total demand as shown by data line 708 is the data line 706 (e.g., total available power+storage) to satisfy the microgrid demand. Also as illustrated in FIG. 7, load curtailment was needed at about 6 hours and 12 hours to maximize the benefits of demand response. This time the curtailment meets the optimal objective function in order to maximize the revenue from demand response. The loads are prioritized and curtailed in a way that the demand response benefit is greater than the cost of the curtailed loads. This is done by through optimization by evaluating the total cost of load curtailment and comparing it against the total benefit from demand response. For example, if the total cost of load curtailment is approximately \$2/kW and the benefit from demand response is approximately \$3/kW, the optimization curtails the load to maximize the net benefits of approximately \$1/kW.

Figure 8:
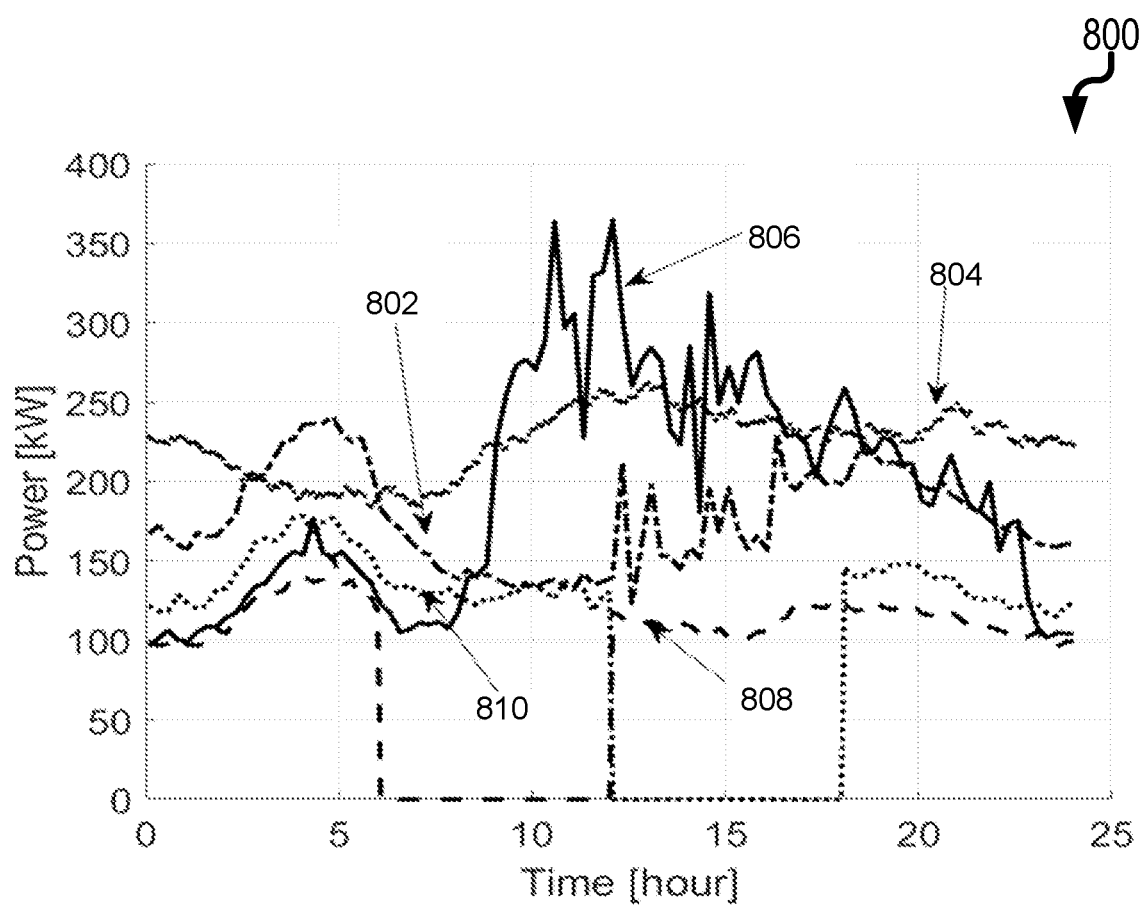
FIG. 8 is a graphical representation of load scheduling that maximizes demand response by internal load management.

FIG. 8 is a graphical representation 800 of load scheduling that maximizes demand response by internal load management. Data lines 802, 804, 806, 808, 810 depict the controlled or curtailed loads in the microgrid accounting to the total demand of the microgrid. As illustrated in FIG. 8, data line 808 is curtailed at about 6 hours as illustrated by the zero power level. Data line 810 is curtailed at about 12 as illustrated by the zero power level. Once a load is curtailed, the load scheduling described herein prioritizes the load that was not curtailed during that particular day to ensure fairness of curtailment. The load scheduling also ensures a minimum time off for a particular load that is being curtailed. In the example of FIG. 8, the minimum time off is 2 hours as pre-defined in the user/operator parameter.

Figure 9:
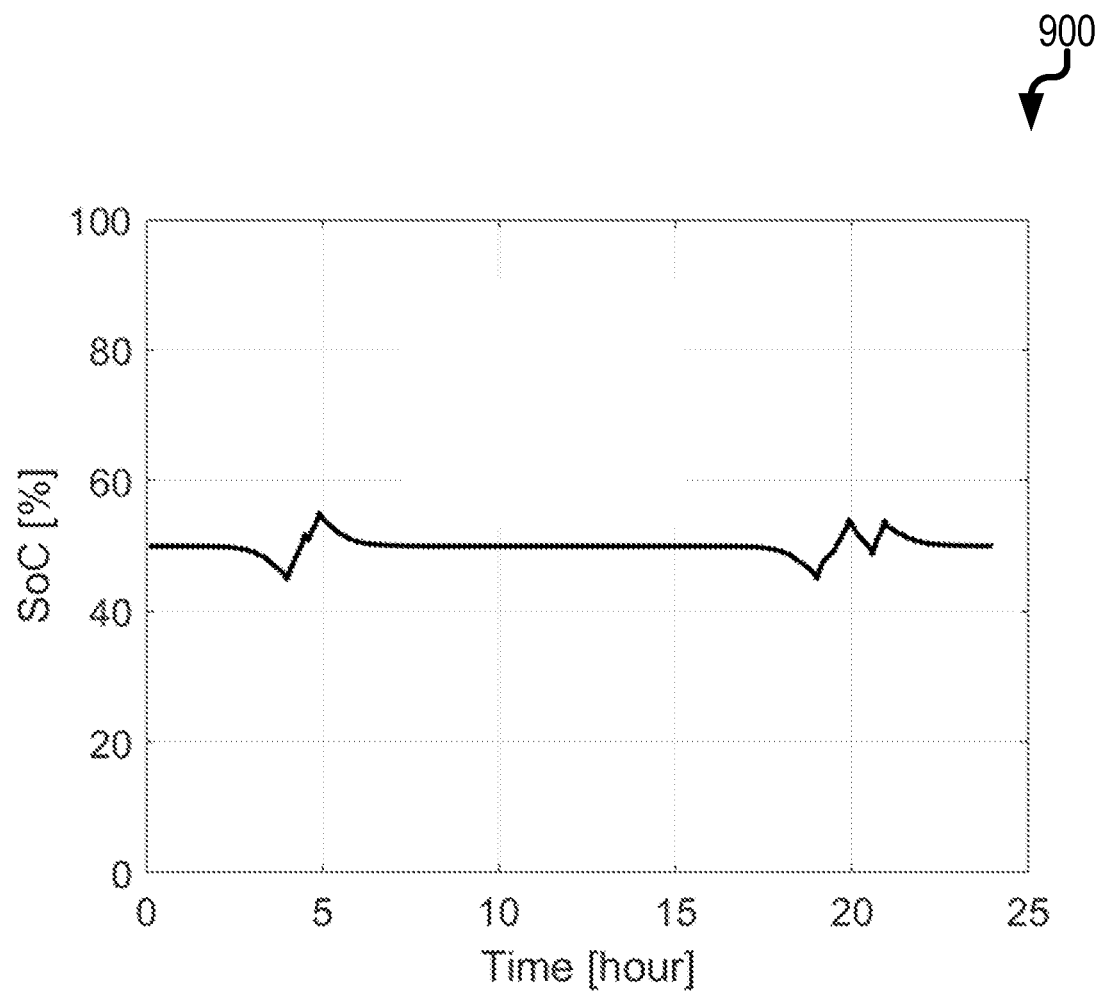
FIG. 9 is a graphical representation that depicts the state of charge of the battery system throughout the 24 hour period.

FIG. 9 is a graphical representation 900 that depicts the state of charge of the battery system throughout the 24 hour period. As illustrated in FIG. 9, the battery charges and discharges to ensure maximization of demand response. This is done by the optimization by evaluating the total cost of load curtailment and comparing it against the total benefit from demand response. For example, if the total cost of load curtailment is approximately $2/kW and the benefit from demand response is approximately $3/kW, the optimization curtails the load to maximize the net benefits of approximately $1/kW. The beginning and ending state of charge are the same because of the need for repeatability for another demand response signal.

Figure 10:
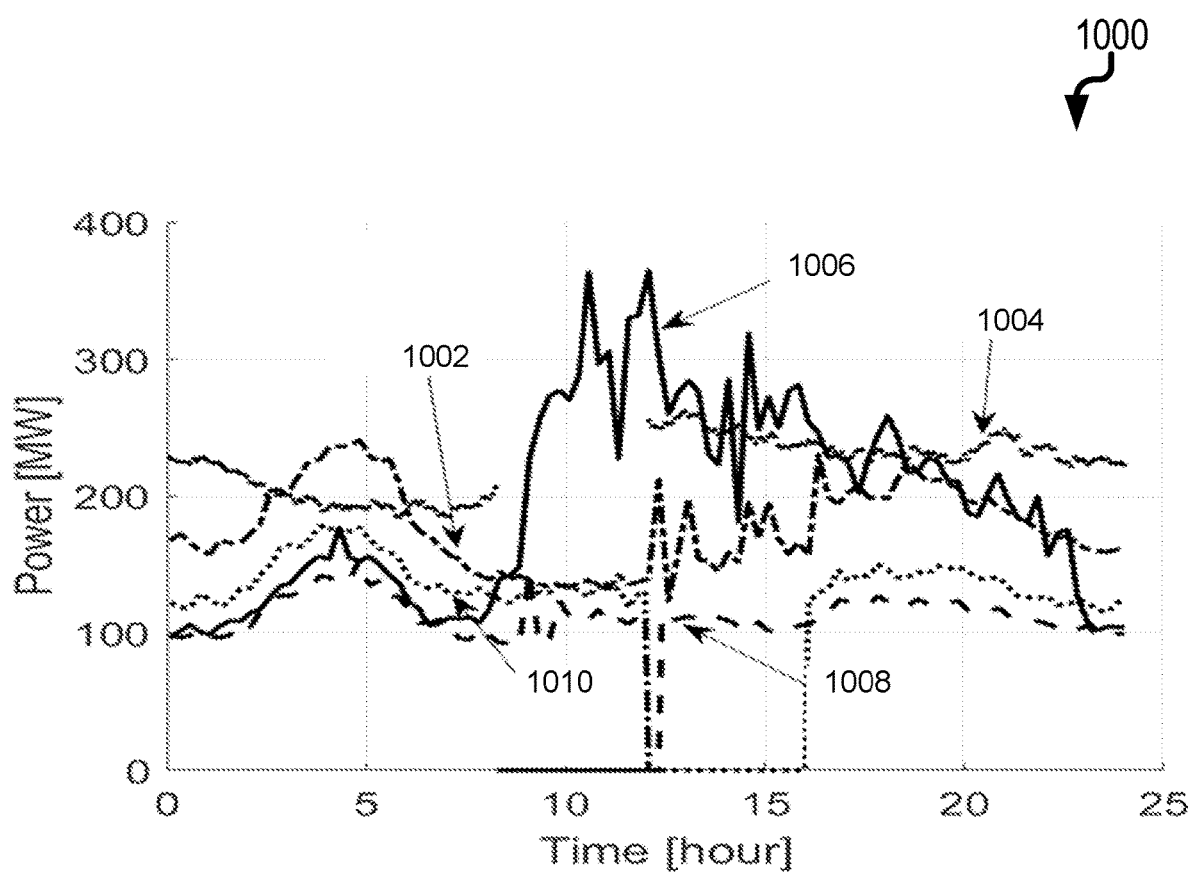
FIG. 10 is a graphical representation of a rolling blackout in an area of the power system.

FIG. 10 is a graphical representation 1000 of a rolling blackout in an area of the power system. Under a rolling blackout condition, the load scheduling described herein minimizes the number of customers that will be affected by a planned power curtailment in an area.

During periods of generation resource or infrastructure loss, or network constraints, it may be necessary to implement rotating load curtailments (e.g., rolling blackouts) to reduce the risk of equipment damage or causing extended or local network outages. A rolling blackout is a process where load curtailments are optimized for a region such as a region fed by multiple substations or groups of local feeders, or a local area fed by a local substation or a local feeder for the period of time that a constraint exists. During the time period of a constraint, an optimized load curtailment quantity is rotated amongst the load that is within the affected area on a periodic basis. The rotating periodic load curtailment is implemented to ensure that an outage is distributed amongst the load in the affected area. This assures outage impact equity and fairness.

Data line 1002 is the actual (e.g., uncontrolled) feeder load in the distribution network. Data line 1004 is the total available generation in the distribution network which includes renewable and/or non-renewable sources of power. Data line 1006 is the total generation plus storage (e.g., with control). Data line 1008 is the controlled or curtailed load in the distribution network in a 24 hour period of the day. As illustrated in FIG. 10, data line 1008 (e.g., total feeder demand) is under data line 1006 (e.g., total generation+ storage) to sustain the microgrid. Additionally as shown in FIG. 10, the rolling blackouts of different feeders was needed at about 12 hours and at about 16 hours to keep the microgrid alive. This is because the optimization hit an active constraint where the available generation was less than the total demand. One example solution curtails the feeders at these two times (e.g., 12 hours and 16 hours) to keep the microgrid operational. In the middle of the day, the battery discharging helps minimize load curtailment while keeping the network operational.

Figure 11:
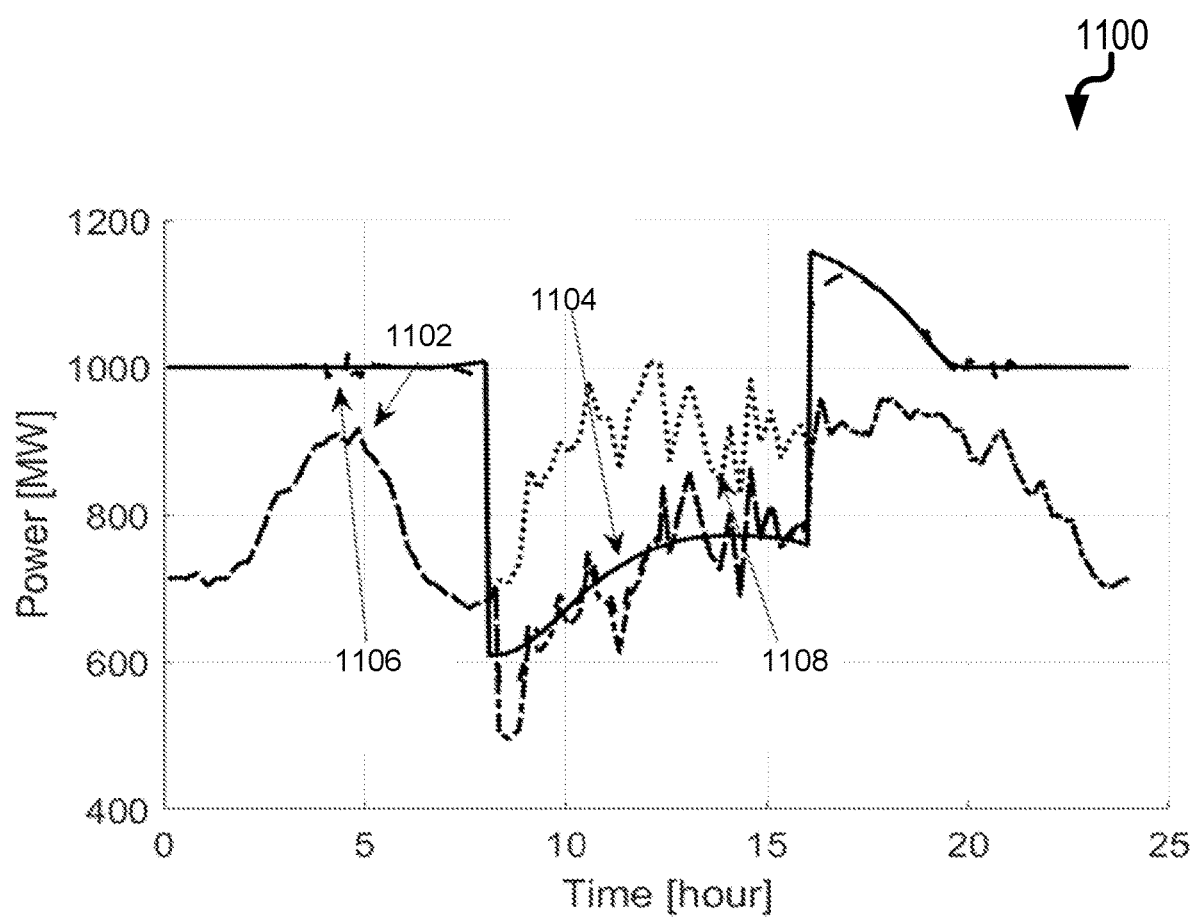
FIG. 11 is a graphical representation depicting the controlled or curtailed feeder loads in the distribution network accounting for the total demand of the distribution network.

FIG. 11 is a graphical representation 1100 depicting the controlled or curtailed feeder loads in the distribution network accounting for the total demand of the distribution network. As illustrated in FIG. 11, data line 1108 is blacked out at about 8 hours. The data line 1108 is back to operational at about 16. Once a feeder is curtailed, the load scheduling prioritizes the feeder that was not curtailed during that particular day to ensure customer fairness of curtailment. The load scheduling algorithm also ensures a minimum time off for a particular feeder that is being curtailed. In the example of FIG. 11, the minimum time off is 2 hours.

Figure 12:
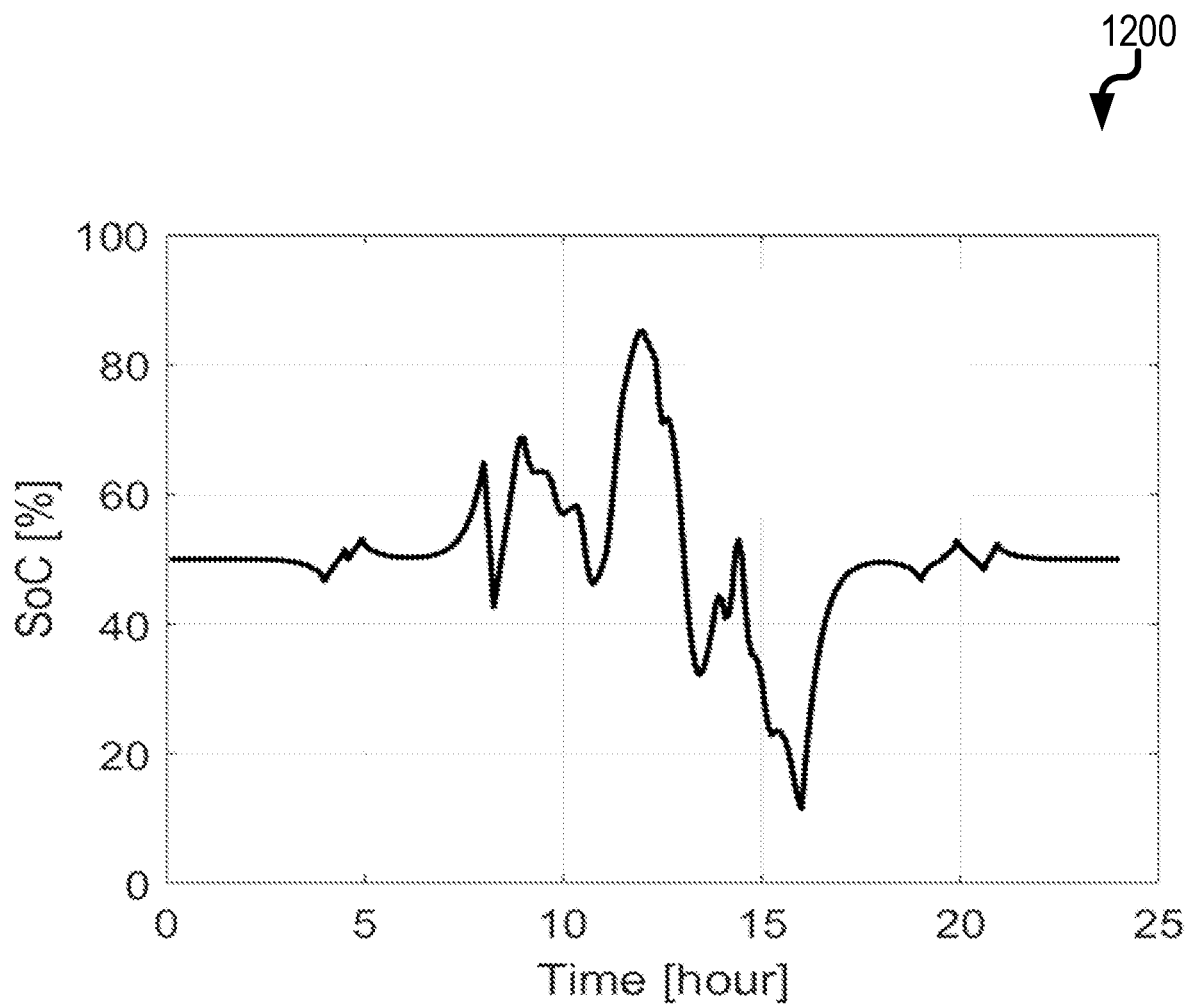
FIG. 12 is a graphical representation that depicts the state of charge of the battery system throughout the 24 hour period.

FIG. 12 is a graphical representation 1200 that depicts the state of charge of the battery system throughout the 24 hour period. As illustrated in FIG. 12, measuring the energy storage of the battery in terms of SoC, the battery charges and discharges to ensure minimization of feeder downtime. The charging and discharging of the battery is related to the power profile of data line 1104 in FIG. 11. Whenever data line 1104 is below data line 1104, the battery is being charged and the SoC in FIG. 12 increases. Whenever data line 1104 is above data line 1104, the battery is being discharged and the SoC in FIG. 12 decreases. The beginning and ending state of charge are the same because of the need for repeatability if the blackout is ongoing. The state of charge bounds is contained between the user/operator pre-defined minimum and maximum limits. In the example of FIG. 12, these minimum and maximum limits range from about 10-90% SoC.

Figure 13:
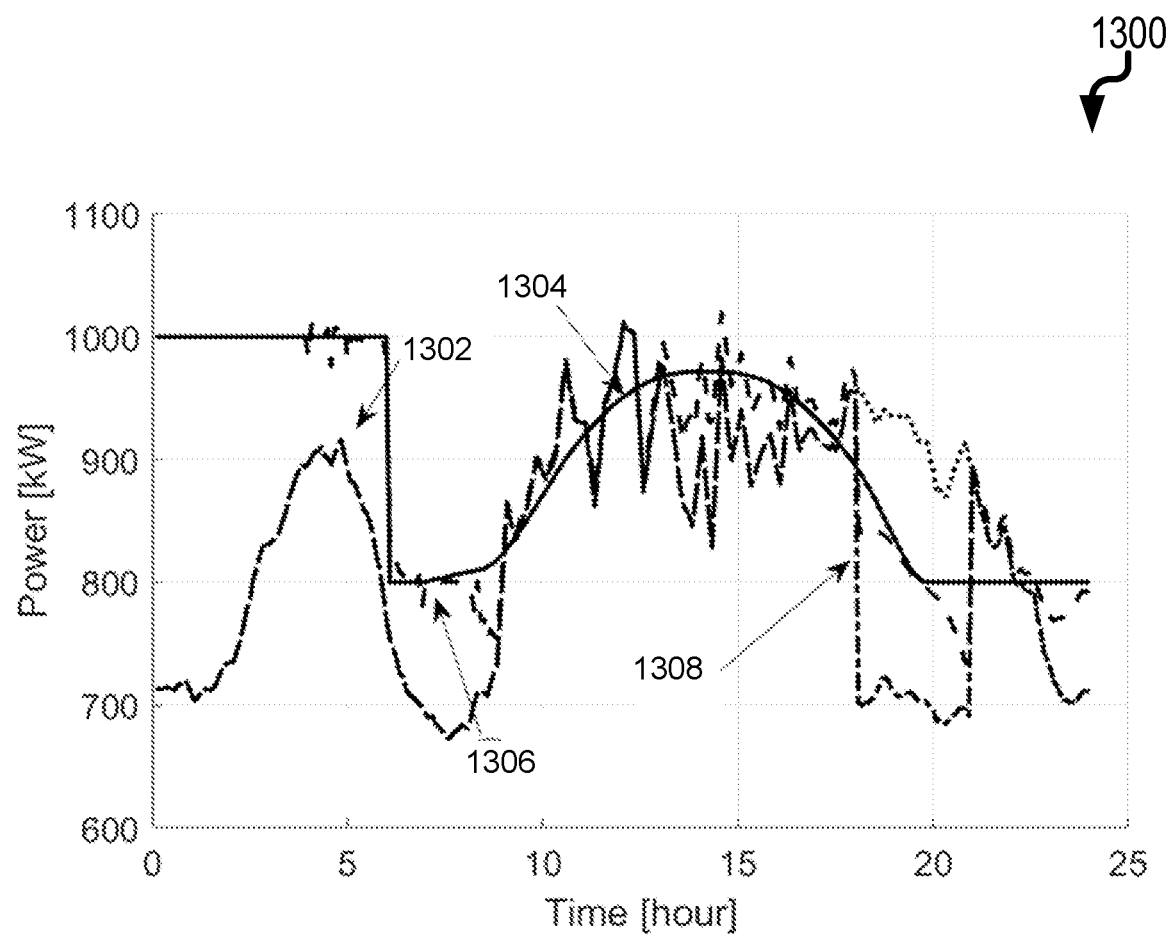
FIG. 13 is a graphical representation depicting load scheduling for a planned outage for both an unknown time and for a fixed amount of time.

FIG. 13 is a graphical representation 1300 depicting load scheduling for a planned outage for both an unknown time and for a fixed amount of time. The example in FIG. 13 illustrates power resources for an area of a power system or a microgrid in which one or more loads will be curtailed for an unknown amount of time and a corresponding case where the time of the curtailment is known.

Planned outages can ensure a safe and reliable network. Planned outages can also be utilized to add, replace, and/or maintain network infrastructure as well as provide safety and reliability in areas of fire or high winds. The time period of a planned outage can be known or has a fixed amount of time to be completed. There are circumstances, however, where a planned outage may evolve to an unknown period of time resulting from unforeseen circumstances.

Data line 1302 is the actual (e.g., uncontrolled) load in the area. Data line 1304 is the total available generation in the area which includes renewable and/or non-renewable sources of power. Data line 1306 is the total generation plus storage (e.g., with control). Data line 1308 is the controlled or curtailed load in the area in a 24 hour period of the day. As illustrated in FIG. 13, data line 1308 (e.g., total area demand) is under data line 1306 (e.g., total generation+ storage) to sustain the area network. Also shown in FIG. 13, the planned outages of different areas were needed at about 18 hours to keep the area operational. This is because the optimization hit an active constraint where the available generation was less than the total demand. One example solution curtails the feeders at this time to keep the microgrid operational. The battery discharging helps minimize load curtailment while keeping the network operational.

Figure 14:
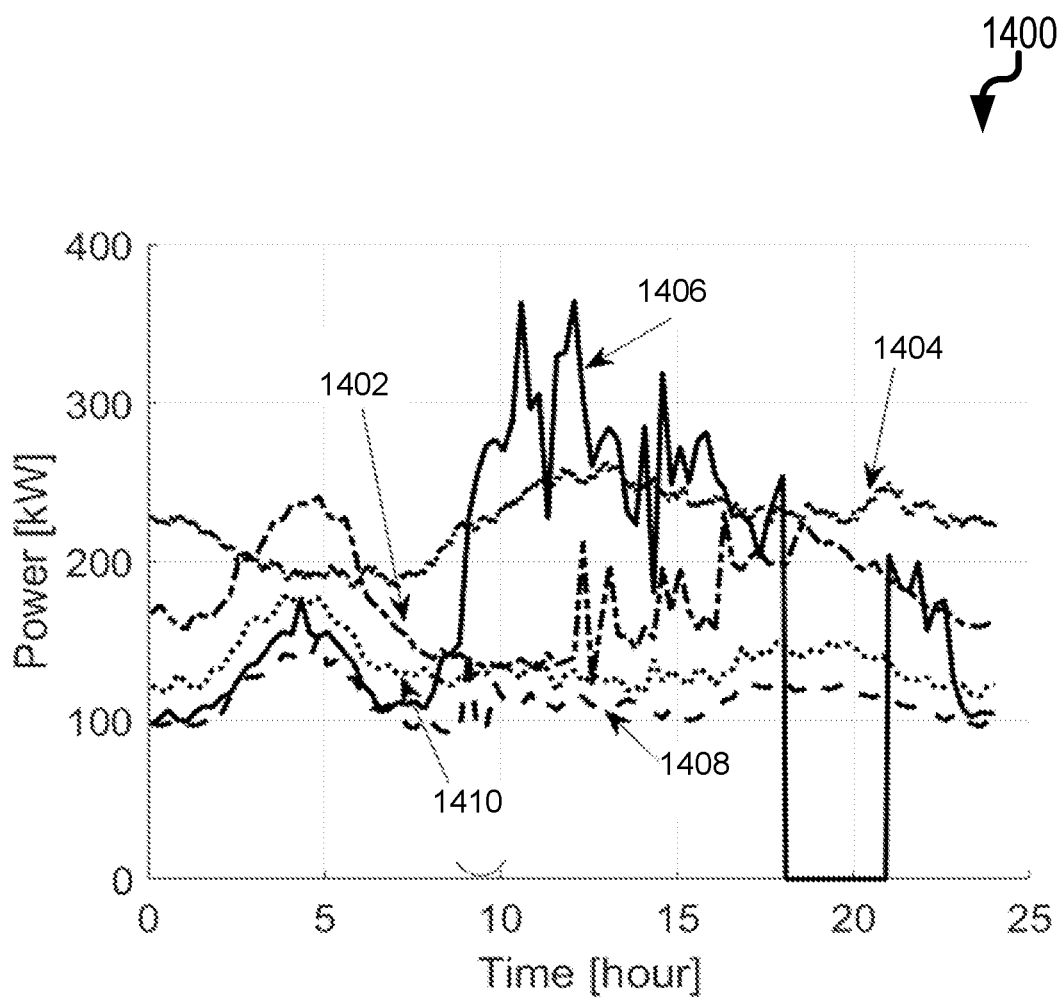
FIG. 14 is a graphical representation depicting the controlled or curtailed loads in the area accounting for the total demand of the network.

FIG. 14 is a graphical representation 1400 depicting the controlled or curtailed loads in the area accounting for the total demand of the network. As illustrated in FIG. 14, data line 1406 is curtailed at about 18 hours as illustrated by zero power. Data lines 1402, 1404, 1408 and 1410 represent the other curtailable loads that do not need curtailment to meet the optimization limits. Once the load is curtailed, the load scheduling prioritizes the load in the area which was not curtailed during that particular day to ensure customer fairness of curtailment. The load scheduling also ensures a user/operator pre-defined minimum time off for a particular load that is being curtailed. In the example of FIG. 14, the minimum time off is about 2 hours.

Figure 15:
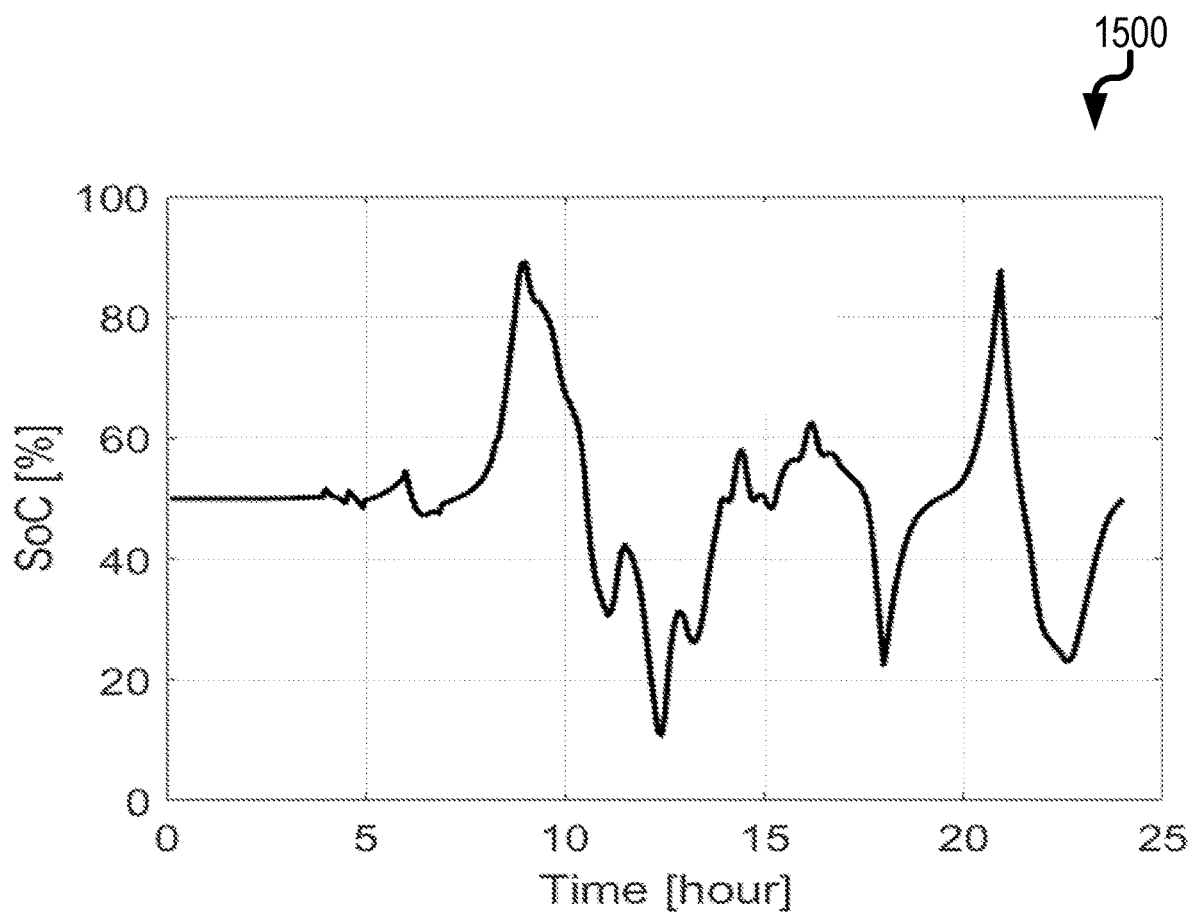
FIG. 15 is a graphical representation that depicts the state of charge of the battery system throughout the 24-hour period.

FIG. 15 is a graphical representation 1500 that depicts the state of charge of the battery system throughout the 24-hour period. As illustrated in FIG. 15, the battery charges and discharges to ensure minimization of load curtailment during an outage. The beginning and ending state of charge are the same because of the need for repeatability if the outage is ongoing. The state of charge bounds is contained between minimum and user/operator pre-defined maximum limits based on user input. In the example of FIG. 15, these minimum and maximum limits are about 10-90%.

Figure 16:
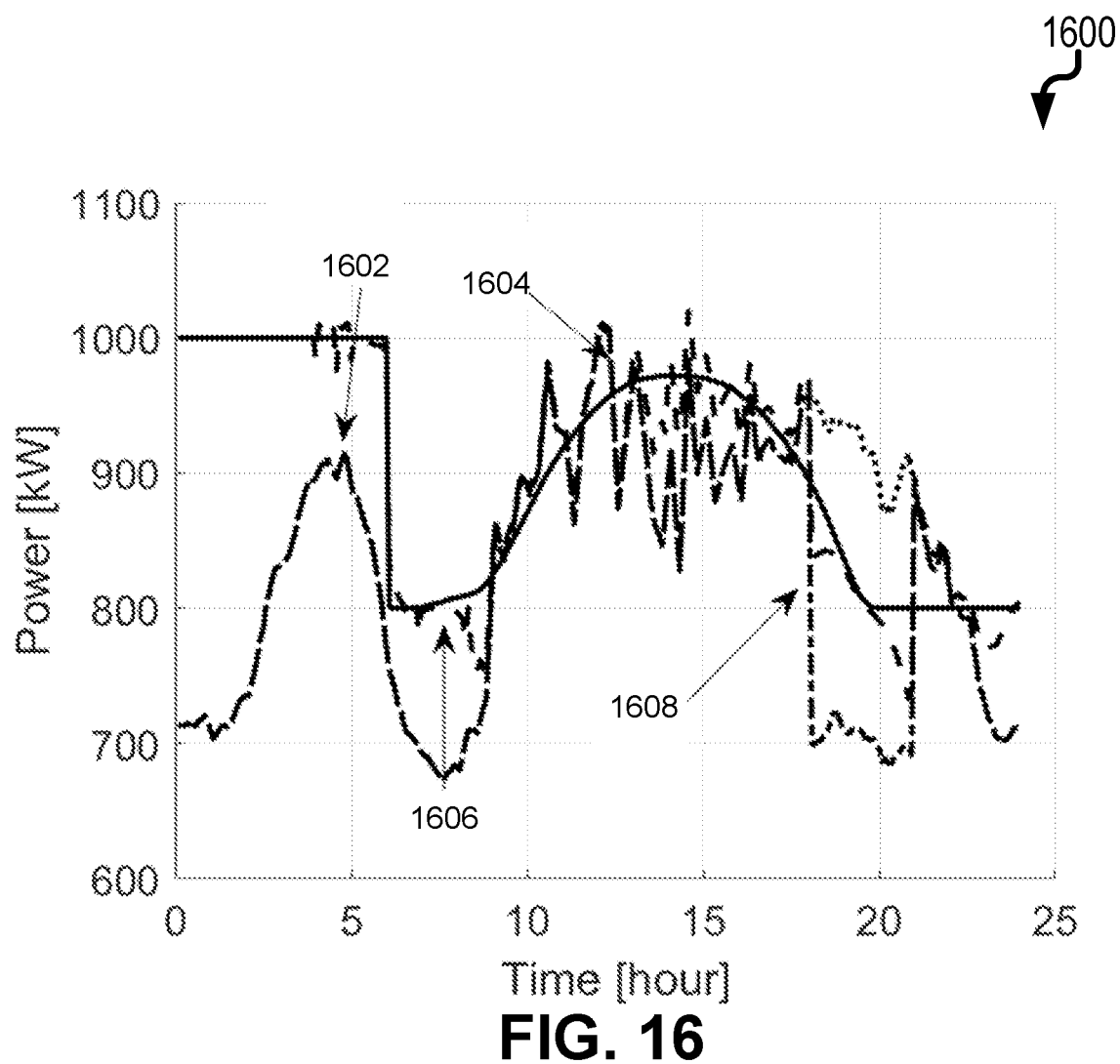
FIG. 16 is a graphical representation of a fixed time, planned outage using the load scheduling techniques described herein.

FIG. 16 is a graphical representation 1600 of a fixed time, planned outage using the load scheduling techniques described herein. Data line 1602 depicts the actual (e.g., uncontrolled) load in the area. Data line 1604 depicts the total available generation in the area which consists of all renewable and non-renewable sources of power. Data line 1606 depicts the total generation plus storage (e.g., with control). Data line 1608 depicts the controlled or curtailed load in the area in a 24-hour period of the day. As illustrated in FIG. 16, data line 1608 (e.g., total area demand) is under 1606 (e.g., total generation+storage) to sustain the area network. Also as shown in FIG. 16, the planned outages of different areas were needed at about 18 hours to keep the area operational. This is because the optimization hit an active constraint where the available generation was less than the total demand. One example solution curtails the feeders at this time to keep the microgrid operational. In the beginning of curtailment period, the battery discharging helps minimize load curtailment while keeping the network operational.

Figure 17:
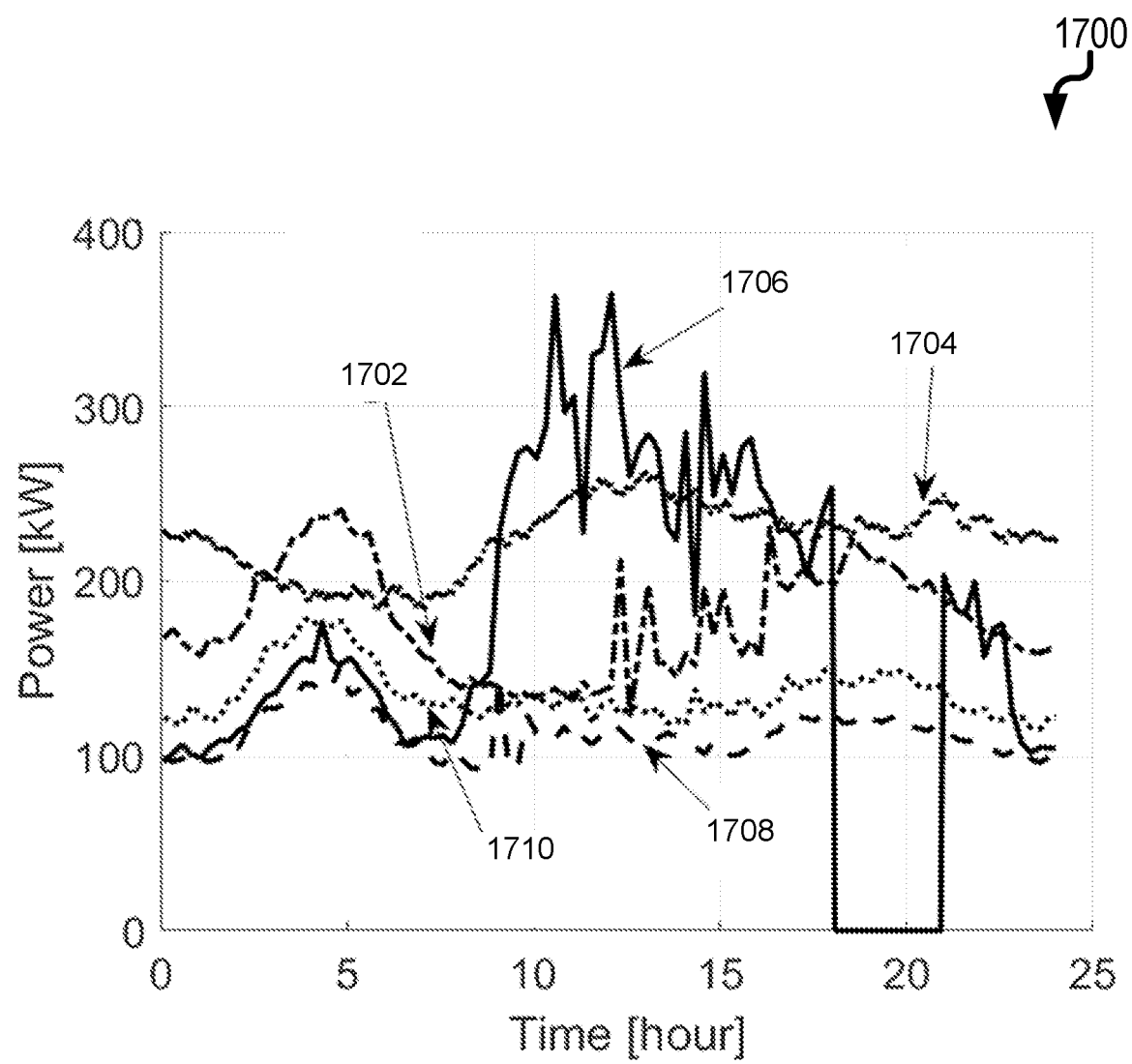
FIG. 17 is a graphical representation that depicts the controlled or curtailed loads in the area accounting for the total demand of the network of a fixed time, planned outage using the load scheduling techniques described herein.

FIG. 17 is a graphical representation 1700 that depicts the controlled or curtailed loads in the area accounting for the total demand of the network of a fixed time, planned outage using the load scheduling techniques described herein. As illustrated in FIG. 17, the data line 1706 of a load is curtailed at about 18 hours as shown by zero power. Data lines 1702, 1704, 1708 and 1710 represent the other curtailable loads that do not need curtailment to meet the optimization limits. Once the load is curtailed, the load scheduling prioritizes the load in the area which was not curtailed during that particular day to ensure customer fairness of curtailment. The load scheduling also ensures a user/operated pre-defined minimum time off for a particular load that is being curtailed. In the example of FIG. 17, the minimum time off is about 2 hours.

Figure 18:
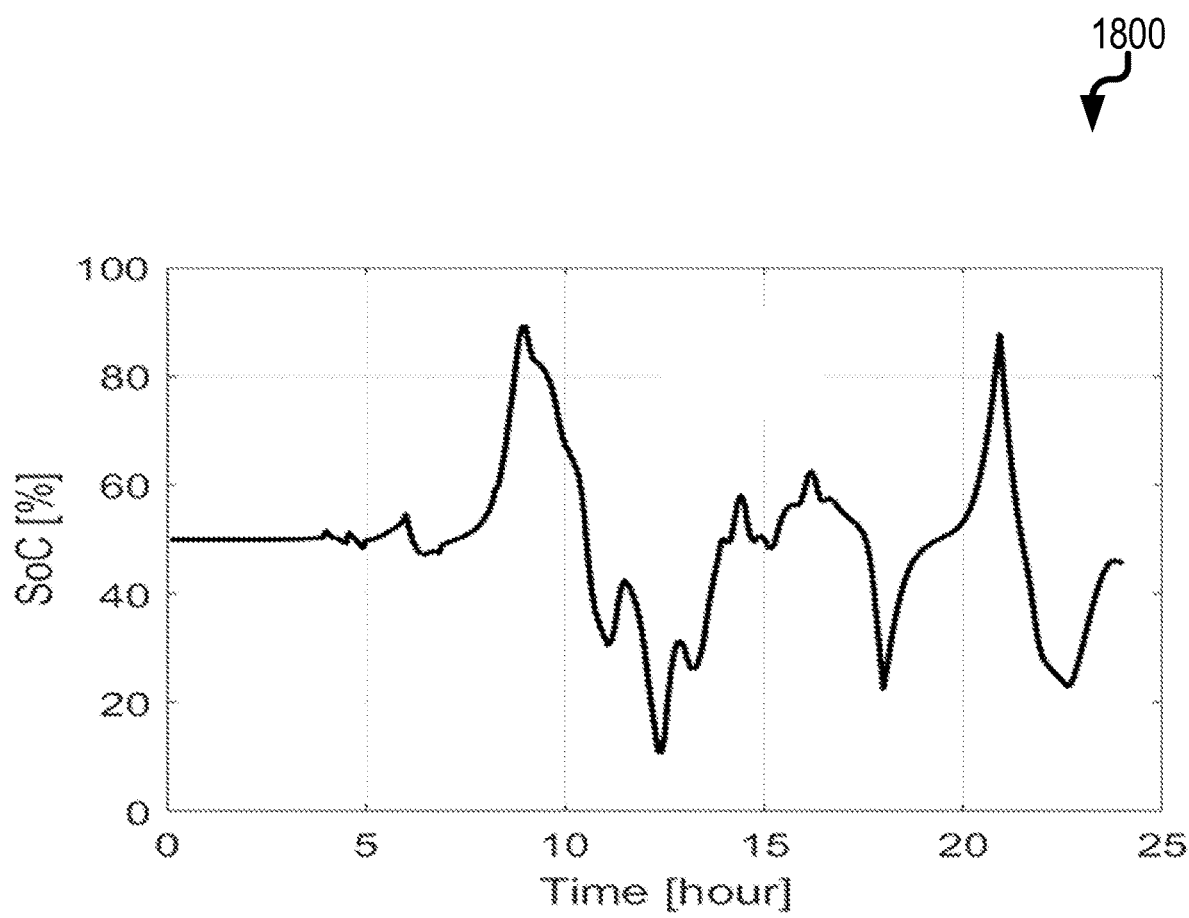
FIG. 18 is a graphical representation that depicts the state of charge of the battery system throughout the 24 hour period.

FIG. 18 is a graphical representation 1800 that depicts the SoC of the battery system throughout the 24 hour period. As illustrated in FIG. 18, the battery charges and discharges to ensure minimization of load curtailment during an outage. The beginning and ending state of charge are not the same because the outage is fixed time and the battery usage can be maximized. The SoC bounds is contained between the minimum and maximum energy storage limits determined by the operational constraints of the battery or energy storage limits determined by a user or an operator. The minimum and maximum limits in the example of FIG. 18 are about 10-90%.

Figure 19:
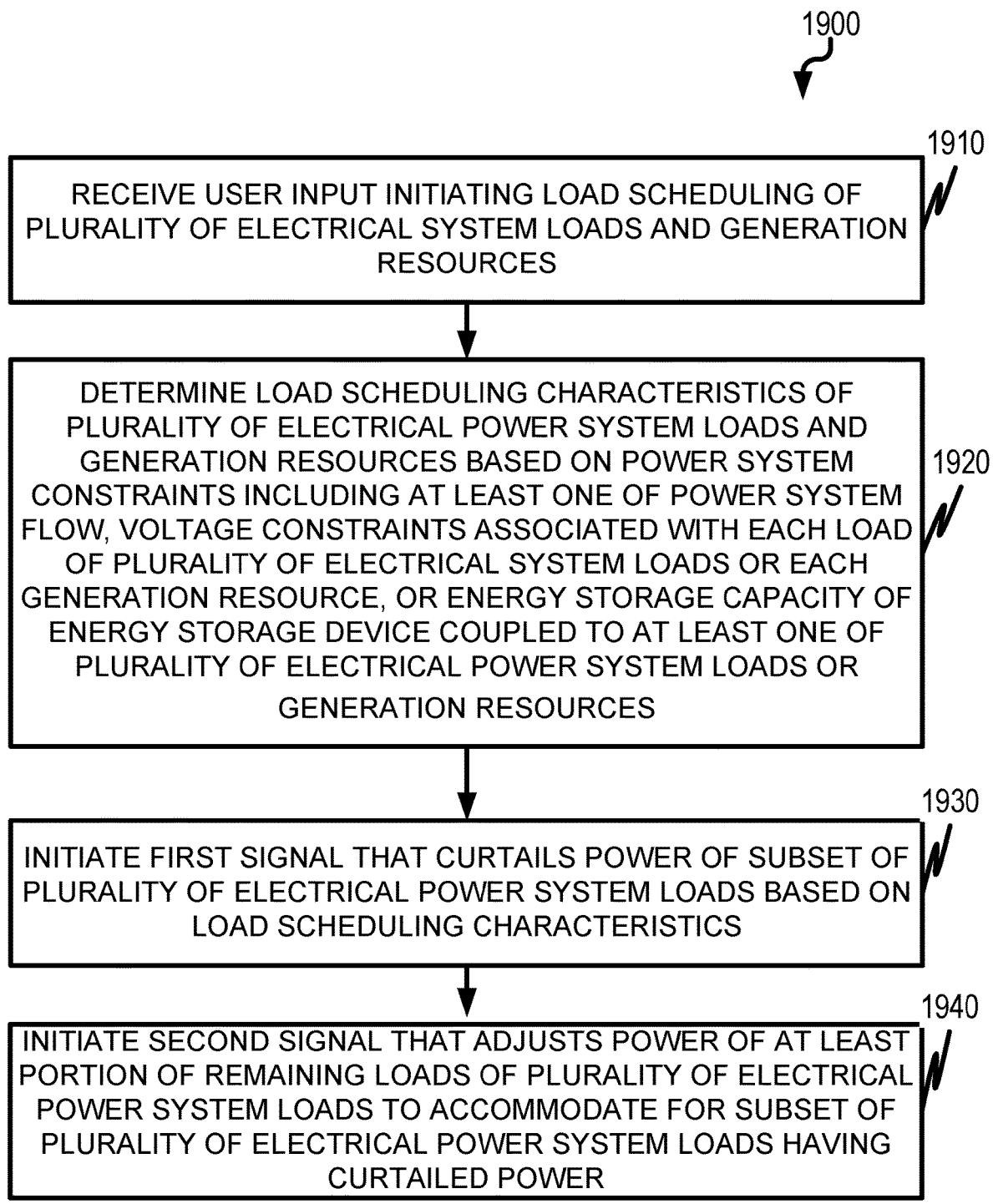
FIG. 19 is a flow chart illustrating load scheduling.

FIG. 19 is a flow chart 1900 illustrating load scheduling. A load scheduling module 2022 (described in more detail in FIG. 20) receives, at 1910, user input initiating load scheduling of the plurality of electrical system loads and the generation resources. The load scheduling module 2022 determines, at 1920, load scheduling characteristics of the plurality of electrical power system loads and the generation resources based on power system constraints including at least one of power system flow, voltage constraints associated with each load of the plurality of electrical system loads or each generation resource, or energy storage capacity of an energy storage device coupled to at least one of the plurality of electrical power system loads or the generation resources. The load scheduling module 2022 initiates, at 1930, a first signal that curtails power of a subset of the plurality of electrical power system loads based on the load scheduling characteristics. The load scheduling module 2022 initiates, at 1940, a second signal that adjusts power of at least a portion of remaining loads of the plurality of electrical power system loads to accommodate for the subset of the plurality of the electrical power system loads having curtailed power.

Figure 21:
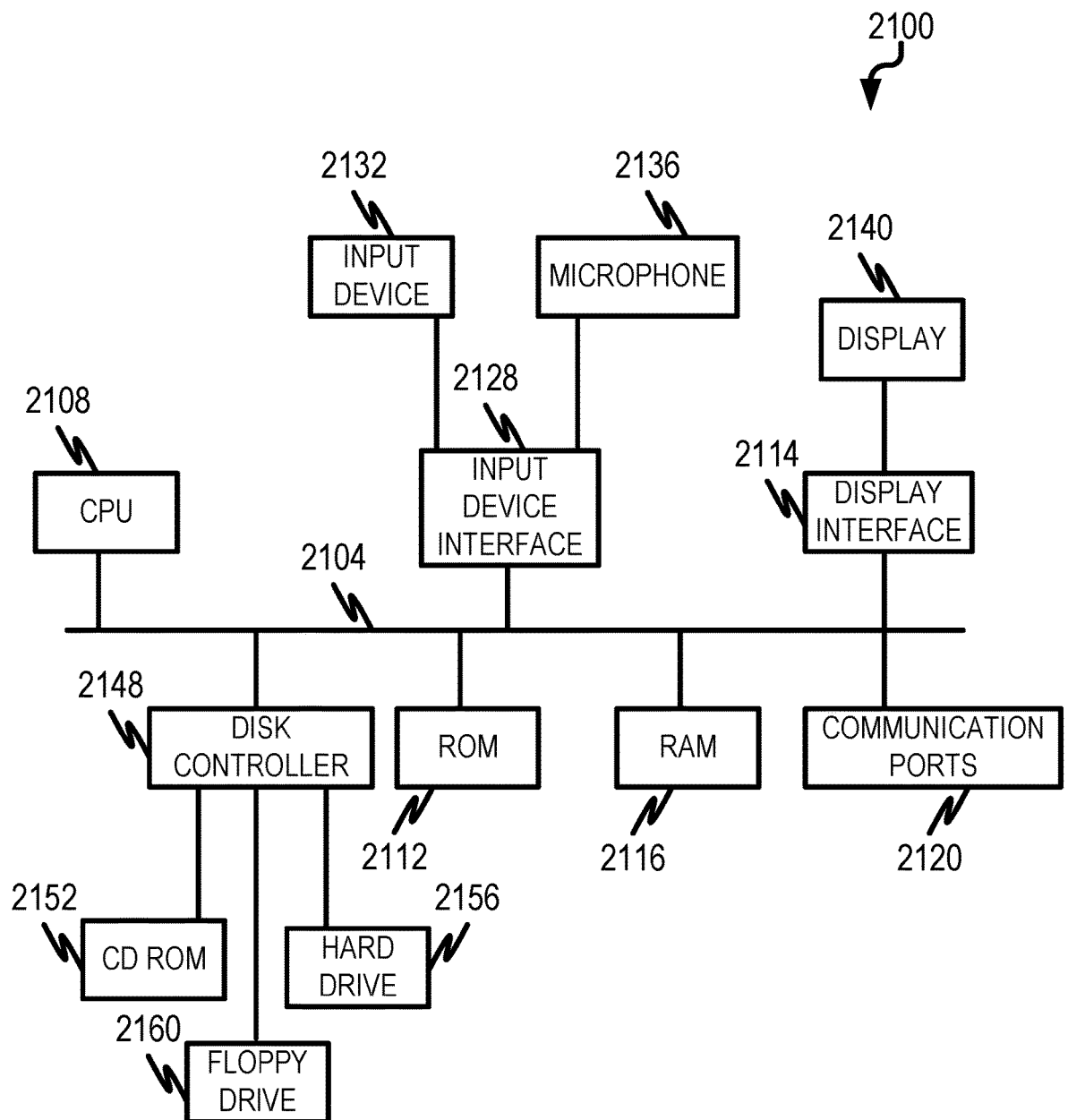
FIG. 21 is a diagram illustrating a sample computing device architecture for implementing various aspects described herein.

FIG. 20 is a system block diagram illustrating an architecture 2000 for use in connection with the current subject matter. The current subject matter is described in connection with an arrangement involving one or more client devices 2010 and one or more servers 2020 which can communicate over one or more networks 2030. Each of the one or more client devices 2010 and the one or more servers 2020 comprise one or more programmable data processors and memory for storing instructions for executed by such data processor(s). The one or more servers 2020 can include a load scheduling module 2022 configured to carry out the load scheduling described herein. The load scheduling module can be a standard computing device (e.g., as illustrated in FIG. 21) containing software that initiates various curtailment and adjustment signals as described herein. Furthermore, it will be appreciated that each of the client devices 2010 or servers 2020 can comprise more than one computing device depending on the desired configuration and that the illustrations in FIG. 20 is simplified to aid in the understanding of the current subject matter.

The functional blocks described herein can be implemented in commercial computing platforms such as advanced Programmable Logic Controllers (PLCs) or in industrial grade PCs such as the Schweitzer Engineering Laboratories (SEL) 3355 Industrial Personal Computer (PC) that runs multiple tasks, one of which is the controller. The controller processing functionality can be written in any computer language, but one implementation is using C++ running on Windows or Linux operating systems. The output commands from then controller may use standard control protocols such as IEC 61850 Goose or Modbus over Ethernet. In order to maintain high security, fiber optic connections can be used between the controller platform and the providers and/or consumers of the power grid.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

FIG. 21 is a diagram illustrating a sample computing device architecture 2100 for implementing various aspects described herein. A system bus 2104 can serve as the information highway interconnecting the other illustrated components of the hardware. A processing system 2108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 2112 and random access memory (RAM) 2116, can be in communication with the processing system 1308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 2148 can interface one or more optional disk drives to the system bus 2104. These disk drives can be external or internal floppy disk drives such as 2160, external or internal CD-ROM, CD-R, CD-RW or DVD, or solid state drives such as 2152, or external or internal hard drives 2156. As indicated previously, these various disk drives 2152, 2156, 2160 and disk controllers are optional devices. The system bus 2104 can also include at least one communication port 2120 to allow for communication with external devices either physically connected to the computing system or available externally through a wired or wireless network. In some cases, the communication port 2120 includes or otherwise comprises a network interface.

To provide for interaction with a user, the subject matter described herein can be implemented on a computing device having a display 2140 (e.g., a CRT (cathode ray tube) or LCD (liquid crystal display) monitor) for displaying information obtained from the system bus 2104 to the user and an input device 2132 such as keyboard and/or a pointing device (e.g., a mouse or a trackball) and/or a touchscreen by which the user can provide input to the computer. Other kinds of input devices 2132 can be used to provide for interaction with a user as well; for example, feedback provided to the user can be any form of sensory feedback (e.g., visual feedback, auditory feedback by way of a microphone 2136, or tactile feedback); and input from the user can be received in any form, including acoustic, speech, or tactile input. In the input device 2132 and the microphone 2136 can be coupled to and convey information via the system bus 2104 by way of an input device interface 2128. Other computing devices, such as dedicated servers, can omit one or more of the display 2140 and display interface 2114, the input device 2132, the microphone 2136, and input device interface 2128.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of determining scheduling of a plurality of electrical power system loads and generation resources, the method comprising:
receiving, by a load scheduling module, user input initiating load scheduling of the plurality of electrical system loads and the generation resources;
determining, by the load scheduling module, load scheduling characteristics of the plurality of electrical power system loads and the generation resources based on power system constraints including at least one of power system flow, voltage constraints associated with each load of the plurality of electrical system loads or each generation resource, or energy storage capacity of an energy storage device coupled to at least one of the plurality of electrical power system loads or the generation resources;
initiating, by the load scheduling module, a first signal that curtails power of a subset of the plurality of electrical power system loads based on the load scheduling characteristics; and
initiating, by the load scheduling module, a second signal that adjusts power of at least a portion of remaining loads of the plurality of electrical power system loads to accommodate for the subset of the plurality of the electrical power system loads having curtailed power; wherein the load scheduling characteristics are determined by:

$$J = \min_{u_i, P_{bi}} \sum_{i=1}^{N} G_i + (C_{i1}L_{i1}u_{i1} + C_{i2}L_{i2}u_{i2} + \ldots + C_{in}L_{in}u_{in}) + P_{bi}$$

where $G_i$ is available generation, $u_i$ is a decision binary signal if a load is switched on or off, $C_i$ is a cost multiplier, $L_i$ is a load value of a shed load, i and n are each a number of curtailable loads, and $P_{bi}$ is a battery output power.

2. The method of claim 1, wherein the plurality of electrical power system loads comprise one or more clusters coupled to a power grid and a power level of the energy storage device is independent from power curtailment or power adjustment.

3. The method of claim 2, wherein the load scheduling characteristics are further determined by:

$$J = \min_{u_i} \sum_{i=1}^{N} C_{i1}L_{i1}u_{i1} + C_{i2}L_{i2}u_{i2} + \ldots + C_{in}L_{in}u_{in} + P_{bi}$$

where $u_i$ is a decision binary signal if the load is switched on or off, $C_i$ is a cost multiplier, $L_i$ is a load value of a shed load, i and n are each a number of curtailable loads, and $P_{bi}$ is a battery output power.

4. The method of claim 1, wherein the plurality of electrical power system loads and the plurality of generation resources are islanded and wherein the energy storage resource is subject to power curtailment or power adjustment.

5. The method of claim 1, wherein the determining is performed over a moving window with n-intervals.

6. The method of claim 1, wherein the determining is subject to one or more power system constraints comprising power balancing, voltage bus constraints, branch current limits, shedding capability, priority of load units, or forecasted shedding capability load and generation.

7. The method of claim 1, wherein the plurality of electrical power system loads and generation resources are prioritized.

8. The method of claim 1, wherein the determining comprises at least one of user constraints including minimum continuous duration of control, maximum duration of control within a defined review period, minimum lockout control period after cessation of control, or maximum continuous duration of control in review period.

9. The method of claim 1, wherein the determining, the curtailing, and the adjusting occurring during periods of resource constraints to minimize or prevent implementation of rolling blackouts, rotating load curtailments, or automate rolling blackout implementations.

10. The method of claim 1, wherein the determining comprises at least one of dispatch priority conditions including sensitivity of loads on a power system network or fair play dispatch or curtailment schemes.

11. The method of claim 1, wherein at least one constraint of the optimization includes the minimum on or off time of a load or the number of on/off switching of the load during a 24 hour period.

12. A system comprising:
at least one data processor; and
memory storing instructions, which when executed by at least one data processor, result in operations comprising:
receiving, by a load scheduling module, user input initiating load scheduling of the plurality of electrical system loads and the generation resources;
determining, by the load scheduling module, load scheduling characteristics of the plurality of electrical power system loads and the generation resources based on power system constraints including at least one of power system flow, voltage constraints associated with each load of the plurality of electrical system loads or each generation resource, or energy storage capacity of an energy storage device coupled to at least one of the plurality of electrical power system loads or the generation resources;
initiating, by the load scheduling module, a first signal that curtails power of a subset of the plurality of electrical power system loads based on the load scheduling characteristics; and
initiating, by the load scheduling module, a second signal that adjusts power of at least a portion of remaining loads of the plurality of electrical power system loads to accommodate for the subset of the plurality of the electrical power system loads having curtailed power;
wherein the load scheduling characteristics are determined by:

$$J = \min_{u_i, P_{bi}} \sum_{i=1}^{N} G_i + (C_{i1}L_{i1}u_{i1} + C_{i2}L_{i2}u_{i2} + \ldots + C_{in}L_{in}u_{in}) + P_{bi}$$

where $G_i$ is available generation, $u_i$ is a decision binary signal if a load is switched on or off, $C_i$ is a cost multiplier, $L_i$ is a load value of a shed load, i and n are each a number of curtailable loads, and $P_{bi}$ is a battery output power.

13. The system of claim 12, wherein the plurality of electrical power system loads comprise one or more clusters coupled to a power grid and a power level of the energy storage device is independent from power curtailment or power adjustment.

14. The system of claim 13, wherein the load scheduling characteristics are further determined by:

$$J = \min_{u_i} \sum_{i=1}^{N} C_{i1}L_{i1}u_{i1} + C_{i2}L_{i2}u_{i2} + \ldots + C_{in}L_{in}u_{in} + P_{bi}$$

where $u_i$ is a decision binary signal if the load is switched on or off, $C_i$ is a cost multiplier, $L_i$ is a load value of a shed load, i and n are each a number of curtailable loads, and $P_{bi}$ is a battery output power.

15. The system of claim 12, wherein the plurality of electrical power system loads and the plurality of generation resources are islanded and wherein the energy storage resource is subject to power curtailment or power adjustment.

16. The system of claim 12, wherein the determining is performed over a moving window with n-intervals.

17. The system of claim 12, wherein the determining is subject to one or more power system constraints comprising power balancing, voltage bus constraints, branch current limits, shedding capability, priority of load units, or forecasted shedding capability load and generation.

18. The system of claim 12, wherein the plurality of electrical power system loads and generation resources are prioritized.

19. The system of claim 12, wherein the determining comprises at least one of user constraints including minimum continuous duration of control, maximum duration of control within a defined review period, minimum lockout control period after cessation of control, or maximum continuous duration of control in review period.

20. The system of claim 12, wherein the determining, the curtailing, and the adjusting occurring during periods of resource constraints to minimize or prevent implementation of rolling blackouts, rotating load curtailments, or automate rolling blackout implementations.

21. The system of claim 12, wherein the determining comprises at least one of dispatch priority conditions including sensitivity of loads on a power system network or fair play dispatch or curtailment schemes.

22. The system of claim 12, wherein at least one constraint of the optimization includes the minimum on or off time of a load or the number of on/off switching of the load during a 24 hour period.

23. A non-transitory computer program product storing instructions which, when executed by at least one data processor forming part of at least one computing device, implement operations comprising:

receiving, by a load scheduling module, user input initiating load scheduling of the plurality of electrical system loads and the generation resources;

determining, by the load scheduling module, load scheduling characteristics of the plurality of electrical power system loads and the generation resources based on power system constraints including at least one of power system flow, voltage constraints associated with each load of the plurality of electrical system loads or each generation resource, or energy storage capacity of an energy storage device coupled to at least one of the plurality of electrical power system loads or the generation resources;

initiating, by the load scheduling module, a first signal that curtails power of a subset of the plurality of electrical power system loads based on the load scheduling characteristics; and initiating, by the load scheduling module, a second signal that adjusts power of at least a portion of remaining loads of the plurality of electrical power system loads to accommodate for the subset of the plurality of the electrical power system loads having curtailed power;

wherein the load scheduling characteristics are determined by:

$$J = \min_{u_i, P_{bi}} \sum_{i=1}^{N} G_i + (C_{i1}L_{i1}u_{i1} + C_{i2}L_{i2}u_{i2} + \ldots + C_{in}L_{in}u_{in}) + P_{bi}$$

where $G_i$ is available generation, $u_i$ is a decision binary signal if a load is switched on or off, $C_i$ is a cost multiplier, $L_i$ is a load value of a shed load, i and n are each a number of curtailable loads, and $P_{bi}$ is a battery output power.

24. The non-transitory computer program product of claim 23, wherein the plurality of electrical power system loads comprise one or more clusters coupled to a power grid and a power level of the energy storage device is independent from power curtailment or power adjustment.

25. The non-transitory computer program product of claim 23, wherein the plurality of electrical power system loads and the plurality of generation resources are islanded and wherein the energy storage resource is subject to power curtailment or power adjustment.

* * * * *